United States Patent
Kim

(10) Patent No.: US 12,189,143 B2
(45) Date of Patent: Jan. 7, 2025

(54) CAMERA MODULE COMPRISING A COMPENSATION UNIT

(71) Applicant: LG INNOTEK CO., LTD., Seoul (KR)

(72) Inventor: Ui Jun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 164 days.

(21) Appl. No.: 17/753,960

(22) PCT Filed: Sep. 17, 2020

(86) PCT No.: PCT/KR2020/012558
§ 371 (c)(1),
(2) Date: Mar. 18, 2022

(87) PCT Pub. No.: WO2021/054740
PCT Pub. Date: Mar. 25, 2021

(65) Prior Publication Data
US 2022/0342125 A1    Oct. 27, 2022

(30) Foreign Application Priority Data

Sep. 18, 2019  (KR) .................. 10-2019-0114992

(51) Int. Cl.
*G02B 3/14* (2006.01)
*G03B 17/55* (2021.01)

(52) U.S. Cl.
CPC ............. *G02B 3/14* (2013.01); *G03B 17/55* (2013.01)

(58) Field of Classification Search
CPC ........ G02B 26/004; G02B 3/14; G03B 17/55; G03B 2205/0084; G03B 3/10; G03B 30/00; H04N 23/00; H04N 23/60
See application file for complete search history.

(56) References Cited

U.S. PATENT DOCUMENTS

| 11,991,428 B2* | 5/2024 | Kim ...................... H04N 23/52 |
| 2013/0148059 A1* | 6/2013 | Park ................... G02F 1/133382 349/72 |

(Continued)

FOREIGN PATENT DOCUMENTS

| JP | 2012-108428 A | 6/2012 |
| KR | 10-1143558 B1 | 6/2012 |

(Continued)

OTHER PUBLICATIONS

International Search Report dated Dec. 15, 2020 in International Application No. PCT/KR2020/012558.

*Primary Examiner* — Antoinette T Spinks
(74) *Attorney, Agent, or Firm* — Saliwanchik, Lloyd & Eisenschenk

(57) ABSTRACT

An embodiment of the present invention comprises: a lens assembly including a liquid lens; a temperature sensor sensing the temperature of the liquid lens; an image sensor receiving light passing through the lens assembly; a detection unit detecting a first driving signal applied to the liquid lens so as to adjust an interface of the liquid lens; and a determination unit comparing the temperature with a target temperature to provide a heating signal to a heater for adjusting the temperature of the liquid lens or to provide the temperature to a compensation unit. The compensation unit discloses a camera module generating a second driving signal which readjusts the interface of the liquid lens by compensating the temperature to the first driving signal.

10 Claims, 17 Drawing Sheets

(56) References Cited

U.S. PATENT DOCUMENTS

2017/0090076 A1    3/2017  Nunnink et al.
2019/0377236 A1*  12/2019  Jang .......................... G02F 1/29

FOREIGN PATENT DOCUMENTS

KR    10-2018-0087082 A    8/2018
WO       2018/139859 A1    8/2018

* cited by examiner

| OUTPUT VALUE OF TERMINAL | DIOPTER | DRIVING VOLTAGE CODE |
|---|---|---|
| PV1 | d1 | dv1 |
| PV2 | d2 | dv2 |
| ... | ... | ... |

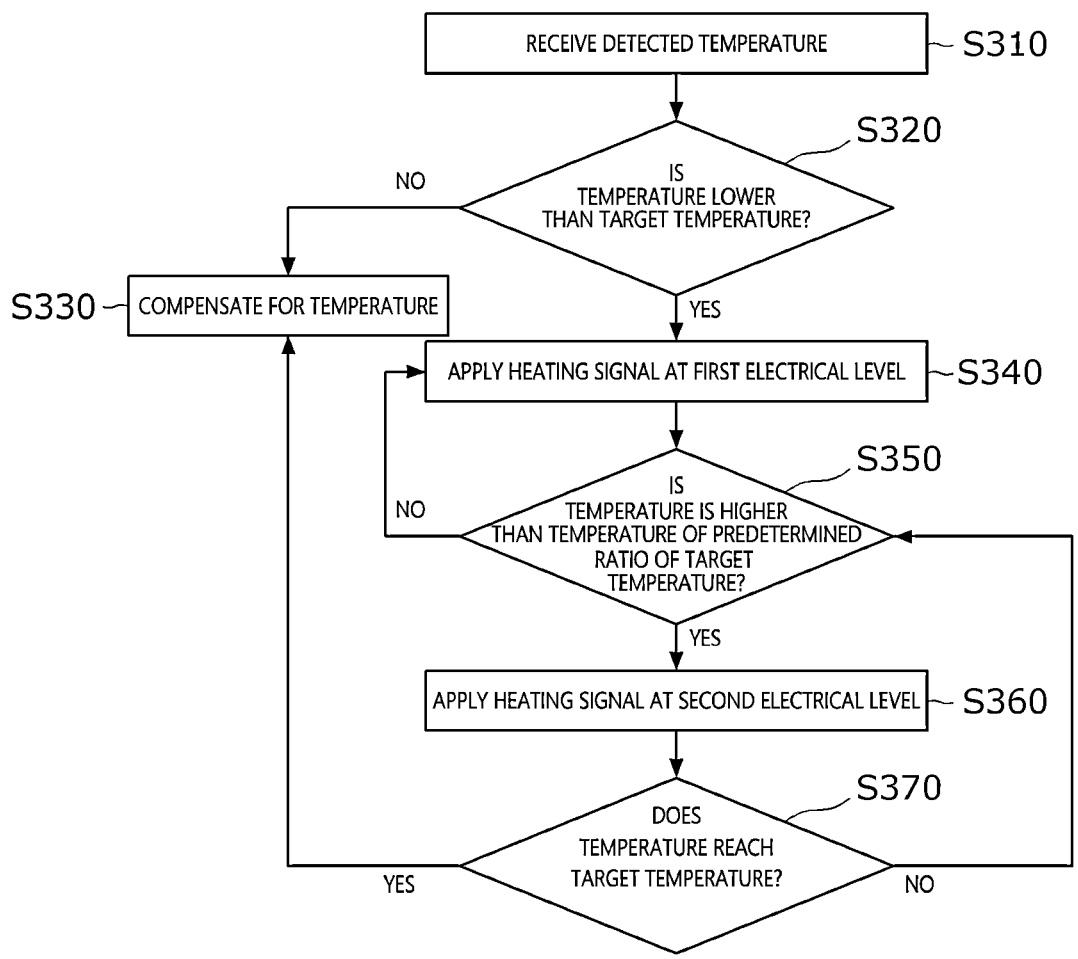

CAMERA MODULE COMPRISING A COMPENSATION UNIT

CROSS-REFERENCE TO RELATED APPLICATIONS

This application is the U.S. national stage application of International Patent Application No. PCT/KR2020/012558, filed Sep. 17, 2020, which claims the benefit under 35 U.S.C. § 119 of Korean Application No. 10-2019-0114992, filed Sep. 18, 2019, the disclosures of each of which are incorporated herein by reference in their entirety.

TECHNICAL FIELD

The present invention relates to a camera module.

BACKGROUND ART

Users of portable devices want optical devices having a high resolution, a small size, and various photographing functions. For example, various photographing functions may be at least one of an optical zoom function (zoom-in/zoom-out), an auto-focusing (AF) function, and an optical image stabilization (OIS) function.

In the related art, a method in which a plurality of lenses are combined and the combined lenses are directly moved is used in order to implement the above-described various photographing functions. However, when the number of lenses increases in this way, the size of the optical device may increase.

The AF function and the OIS function are performed by moving or tilting a plurality of lenses fixed to a lens holder and arranged in an optical axis in an optical axis direction or a direction perpendicular to the optical axis direction. To this end, a separate lens driving device for driving a lens assembly including the plurality of lenses is required. However, the lens driving device consumes high power, a cover glass should be added separately from the camera module to protect the lens driving device, and thus the overall size of the camera module according to the related art increases. In order to solve this problem, researches on a liquid lens unit that performs the AF function and the OIS function by electrically adjusting a curvature of a interface between two liquids are being conducted.

However, since the interface is variously deformed according to a temperature, the improvement in accuracy is required.

DISCLOSURE

Technical Problem

The present invention is directed to providing a camera module that includes a lens capable of adjusting a location of an interface located between two liquids according to electrical energy and compensates for a change in diopter due to the interface deformed according to a temperature of a structure capable of housing the two liquids included in the lens.

The present invention is directed to also providing a camera module capable of adjusting a driving voltage by which a temperature according to a change in spatial frequency response (SFR) according to a change in the temperature of a liquid lens is adjusted and movement of the interface of the liquids according to the temperature is adjusted so that the liquid lens in which the curvature, the degree of bias, and the like of the interface formed by the two liquids included in the lens according to a supplied voltage are adjusted overcomes the characteristic and tendency in which a resolution of the lens is lowered due to a thermal expansion rate according to a temperature change.

The problem to be solved in embodiments is not limited thereto and also includes the purpose or effect that may be identified from the technical solution or the embodiments of the problem to be described below.

Technical Solution

One aspect of the present invention provides a camera module including a lens assembly including a liquid lens, a temperature sensor that detects a temperature of the liquid lens, an image sensor that receives light passing through the lens assembly, a detection unit that detects a first driving signal applied to the liquid lens to adjust an interface of the liquid lens, and a determination unit that compares the temperature with a target temperature to provide a heating signal to a heater for adjusting the temperature of the liquid lens or to provide the temperature to a compensation unit, wherein the compensation unit compensates the first driving signal with the temperature to generate a second driving signal for re-adjusting the interface of the liquid lens.

The determination unit may provide a heating signal at a first electrical level when the temperature is lower than a predetermined ratio of the target temperature.

The determination unit may provide a heating signal at a second electrical level when the temperature is higher than the predetermined ratio of the target temperature and lower than the target temperature, and the heating signal at the second electrical level may be lower than the first electrical level.

The determination unit may provide only the temperature to the compensation unit when the temperature is higher than the target temperature.

The camera module may include a voltage controller that outputs a driving voltage corresponding to a shape of the interface of the liquid lens according to the first driving signal and the second driving signal.

The compensation unit may include a first input unit that receives the first driving signal, a second input unit that receives the temperature, a data unit that stores a plurality of third driving signals for each temperature with respect to a first diopter of the liquid lens and a plurality of fourth driving signals for each temperature with respect to a second diopter of the liquid lens, a first calculation unit that calculates a third diopter of the liquid lens using the first driving signal, and a second calculation unit that calculates the second driving signal corresponding to the temperature and the third diopter using at least one of the plurality of third driving signals and the plurality of fourth driving signals.

The first diopter and the second diopter may be different.

The second calculation unit may calculate a first driving function for the plurality of third driving signals and a second driving function for the plurality of fourth driving signals.

The second calculation unit may calculate a plurality of third driving functions for each temperature from the first driving function and the second driving function and calculate the second driving signal using at least one of the first driving function, the second driving function, and the plurality of third driving functions.

The liquid lens may include a plate including a cavity in which a conductive liquid and a non-conductive liquid are arranged with an interface formed therebetween, a common terminal disposed on the plate, and a plurality of individual terminals arranged under the plate, wherein the first driving signal corresponds to voltages applied to the plurality of individual terminals or an average voltage of the voltages.

Advantageous Effects

Embodiments provide a camera module that inhibits a decrease in resolution or a decrease in accuracy that occurs when an interface of a liquid lens changes according to a temperature.

Various and beneficial advantages and effects of the present invention are not limited to the above description and will be more easily understood in a process of describing specific embodiments of the present invention.

DESCRIPTION OF DRAWINGS

FIG. 17 is a flowchart illustrating a method of driving a camera module according to an embodiment.

MODES OF THE INVENTION

Hereinafter, exemplary embodiments of the present invention will be described in detail with reference to the accompanying drawings.

However, the technical spirit of the present invention is not limited to some described embodiments, and may be implemented in various different forms, and one or more of components may be selectively combined or substituted between the embodiments within the scope of the technical spirit of the present invention.

Further, unless explicitly defined and described, terms (including technical and scientific terms) used in the embodiments of the present invention can be interpreted in a meaning that may be generally understood by those skilled in the art to which the present invention pertains. Terms generally used, such as terms defined in the dictionary, may be interpreted in consideration of the meaning of the context of the related technology.

Further, terms used in the embodiments of the present invention are for describing the embodiments and are not intended to limit the present invention.

In the present specification, a singular form may include a plural form unless specifically mentioned in a phrase, and when "at least one (or one or more) of A, B, and C" is described, one or more of all possible combinations of A, B, and C may be included.

Further, in the description of components of the embodiments of the present invention, the terms such as first, second, A, B, (a) and (b) may be used.

These terms are not used to delimit an essence, an order or sequence, and the like of a corresponding component but used merely to distinguish the corresponding component from other component(s).

Further, when it is described that a first component is "connected" or "coupled" to a second component, the first component may be "connected" or "coupled" to the second component with a third component therebetween as well as the first component may be directly connected or coupled to the second component.

Further, when it is described that a first component is formed or disposed "above" or "below" a second component, the terms "above" and "below" include that one or more third components may be formed or arranged between the first and second components as well as the first and second components may be in direct contact with each other. Further, when the "above or below" is expressed, the "above or below" may include the meanings of a downward direction as well as an upward direction based on one component.

Figure 1:
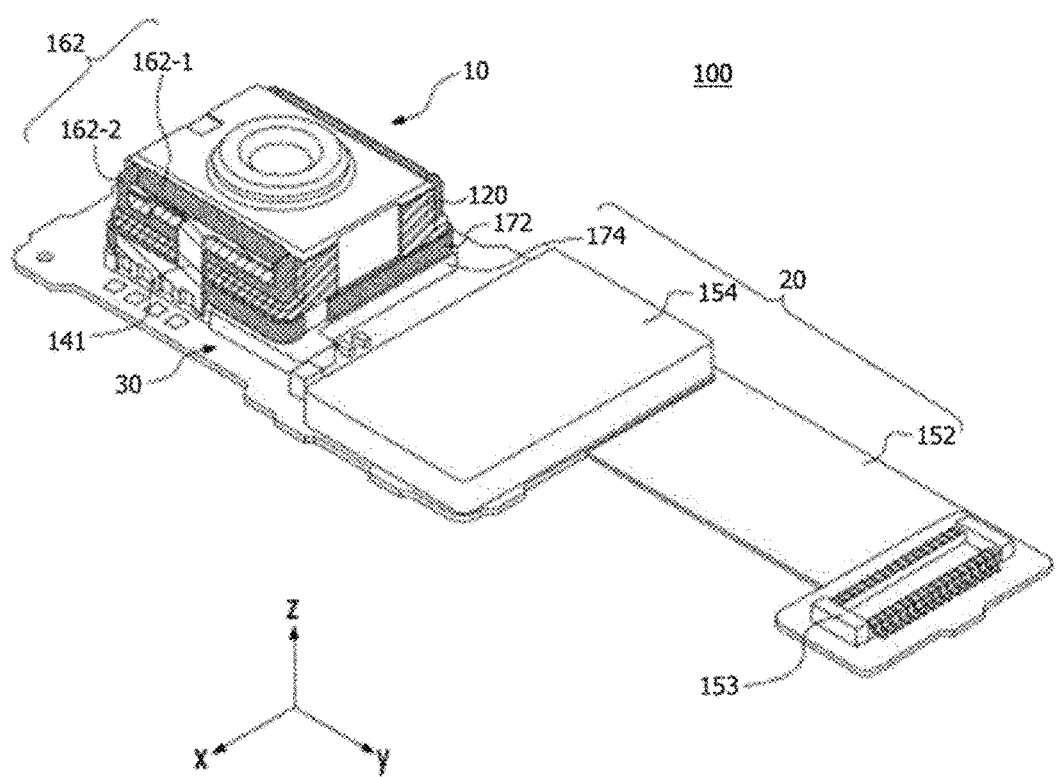
FIG. 1 is a schematic perspective view of a camera module according to an embodiment.

FIG. 1 is a schematic perspective view of a camera module according to an embodiment.

Referring to FIG. 1, a camera module 100 may include a lens assembly 10, a control circuit 20, and an image sensor 30.

First, the lens assembly 10 may include a plurality of lens units and a holder accommodating the plurality of lens units. As described above, the plurality of lens units may include a liquid lens and may further include a first lens unit or a second lens unit. The plurality of lens units may include the first lens unit, the second lens unit, and a liquid lens unit.

The control circuit 20 serves to supply a driving voltage (or an operating voltage) to the liquid lens unit.

The control circuit 20 and the image sensor 30 may be arranged on a single printed circuit board (PCB), but this is merely an example, and the embodiments are not limited thereto.

When the camera module 100 according to the embodiment is applied to an optical device, a configuration of the control circuit 20 may be designed differently according to specifications required by the optical device. In particular, the control circuit may be implemented as a single chip and reduce the magnitude of the driving voltage applied to the lens assembly 10. As a result, the size of the optical device mounted on a portable device may be further reduced. A detailed description thereof will be described below.

Figure 2:
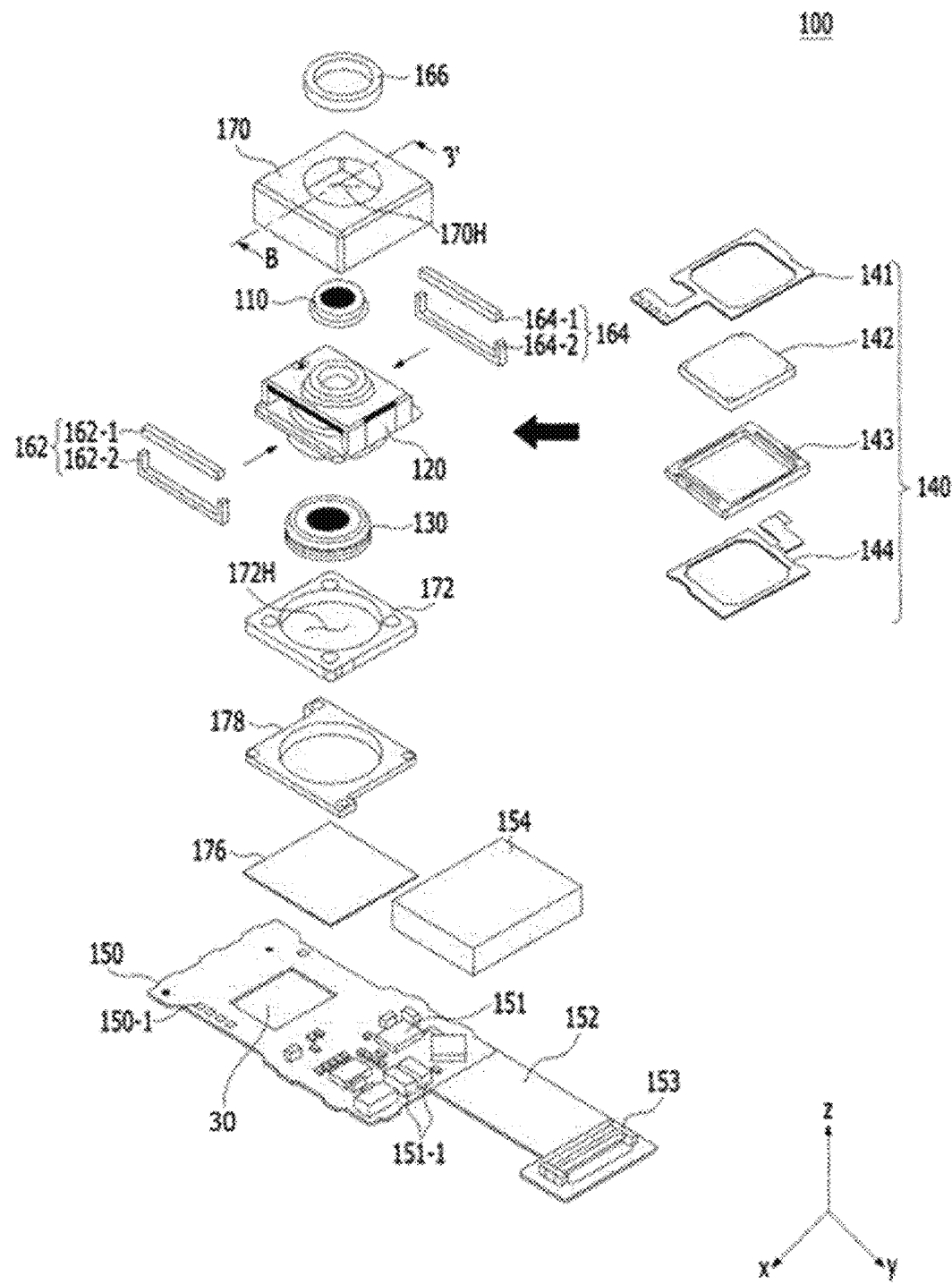
FIG. 2 is an exploded perspective view of the camera module according to an embodiment.
Figure 3:
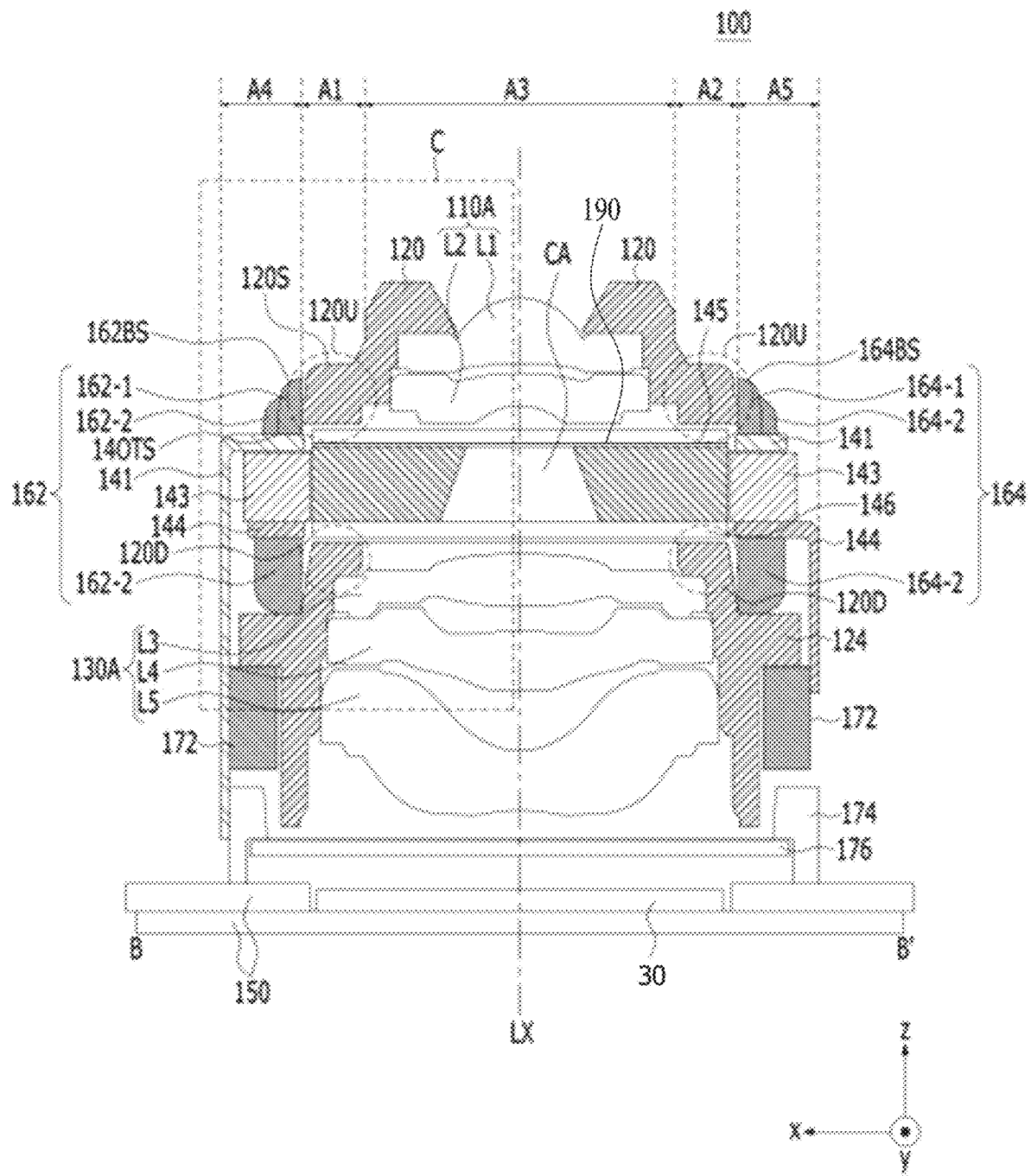
FIG. 3 is a cross-sectional view of the camera module according to an embodiment.
Figure 4:
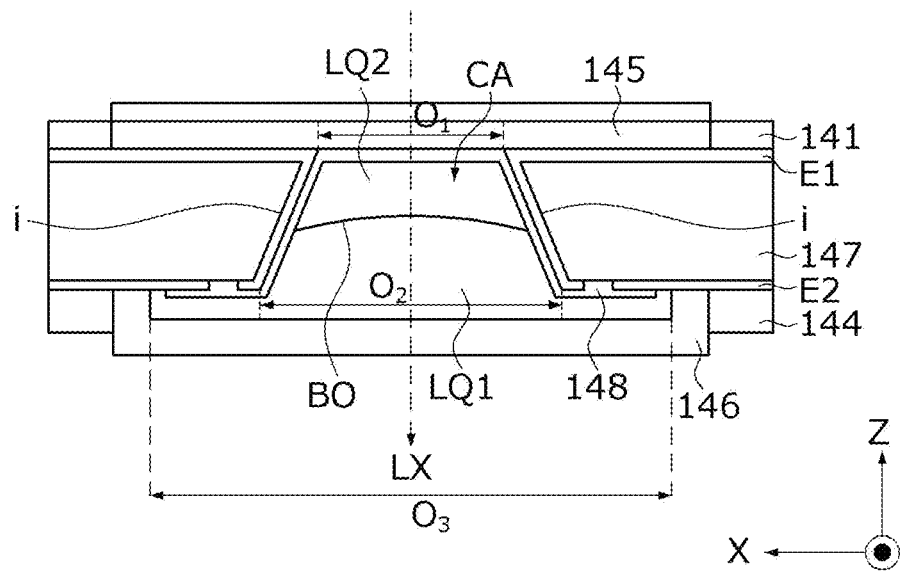
FIG. 4 is a cross-sectional view of a liquid lens unit according to an embodiment.

FIG. 2 is an exploded perspective view of the camera module according to an embodiment, FIG. 3 is a cross-sectional view of the camera module according to an embodiment, and FIG. 4 is a cross-sectional view of a liquid lens unit according to an embodiment.

Referring to FIGS. 2 and 3, the camera module 100 may include the lens assembly, a main substrate 150, and the image sensor 30. Further, the camera module 100 may further include a first cover 170 and a middle base 172. Further, the camera module 100 may further include at least one of adhesive member 162 and 164 and a second cover 174. The at least one adhesive member serves to couple or fix the liquid lens unit 140 to the holder 120.

Here, it is exemplified that the at least one adhesive member includes all of the first adhesive member 162, the second adhesive member 164, and a third adhesive member 166, but the embodiments are not limited thereto. That is, according to another embodiment, the at least one adhesive member may include only some of the first adhesive member 162, the second adhesive member 164, and the third adhesive member 166.

Further, according to the embodiment, at least one of components 110 to 190 of the camera module 100 illustrated in FIG. 2 may be omitted. Alternatively, the camera module 100 may further include at least one component different from the components 110 to 190 illustrated in FIG. 2.

For convenience of description, descriptions of the third adhesive member 166, the first cover 170, the second cover 174, and an optical layer 190 will be omitted.

Further, the lens assembly 10 (see FIG. 1) may include at least one of the liquid lens unit 140, the holder 120, the first lens unit 110 (i.e., 110A), the second lens unit 130 (i.e., 130A), the first adhesive member 162, the second adhesive member 164, and the third adhesive member 166. Further, the lens assembly may be disposed on the main substrate 150.

Further, in the lens assembly, in order to distinguish the first lens unit 110 (i.e., 110A) and the second lens unit 130 (i.e., 130A) from the liquid lens unit 140, the first lens unit 110 (i.e., 110A) may be referred to as a "first solid lens unit," and the second lens unit 130 (i.e., 130A) may be referred to as a "second solid lens unit."

The first lens unit 110 (i.e., 110A) may be a part which is disposed in an upper portion of the lens assembly and into which light is incident from the outside of the lens assembly. That is, the first lens unit 110 (i.e., 110A) may be disposed on the liquid lens unit 140 inside the holder 120. The first lens unit 110 (i.e., 110A) may be implemented as a single lens or may be implemented as two or more lenses arranged on a central axis to form an optical system. Here, the central axis may be an optical axis LX of the optical system formed by the first lens unit 110 (i.e., 110A), the liquid lens unit 140, and the second lens unit 130 (i.e., 130A) included in the camera module 100 or be an axis parallel to the optical axis LX. The optical axis LX may be the same as an optical axis of the image sensor 30.

That is, the first lens unit 110 (i.e., 110A), the liquid lens unit 140, the second lens unit 130 (i.e., 130A), and the image sensor 30 may be arranged along the optical axis LX through an active alignment (AA). Here, the AA may be an operation in which, in order to obtain a better image, optical axes of the first lens unit 110 (i.e., 110A), the second lens unit 130 (i.e., 130A), and the liquid lens unit 140 coincide with each other and an axis or distance relationship between the image sensor 30 and the lens units 110 (i.e., 110A), 130 (i.e., 130A), and 140 is adjusted.

In one embodiment, the AA may be performed through an operation of analyzing image data generated when the image sensor 30 receives light incident from a specific object through at least one of the first lens unit 110 (i.e., 110A), the second lens unit 130 (i.e., 130A), and the liquid lens unit 140. For example, the AA may be performed in the following order.

For example, after an AA (first alignment) of adjusting a relative location between the first lens unit 110 (i.e., 110A), the second lens unit 130 (i.e., 130A), and the image sensor 30 fixed to and mounted on the holder 120 is completed, an AA (second alignment) of adjusting a relative location between the liquid lens unit 140 and the image sensor 30 inserted into the holder 120 may be performed. The first alignment may be performed by a gripper who variously changes locations while the gripper holds the middle base 172, and the second alignment may be performed by the gripper who variously changes locations while the gripper holds s spacer 143 of the liquid lens unit 140. However, the AA may be performed in an order different from the above-described order.

Further, the holder 120 may include an upper holder region 120U disposed above the liquid lens unit 140 and a lower holder region 120D disposed below the liquid lens unit 140. In this case, the first adhesive member 162 and the second adhesive member 164 may couple the liquid lens unit 140 to the upper holder region 120U and the lower holder region 120D, respectively.

Further, when the first adhesive member 162 and the second adhesive member 164 are arranged, the liquid lens unit 140 may be stably fixed and coupled to the holder 120.

Further, the first lens unit 110A may include, for example, two lenses L1 and L2, but this is merely illustrative, and the number of lenses included in the first lens unit 110A may be one or more.

Further, an exposure lens may be disposed on an upper side of the first lens unit 110 (i.e., 110A). Here, the exposure lens may be an outermost lens among the lenses included in the first lens unit 110 (i.e., 110A). That is, the lens L1 located on the uppermost side of the first lens unit 110A is exposed to the upper side, and thus may function as the exposure lens. The exposure lens protrudes outward from the holder 120 and thus there is a possibility that a surface thereof may be damaged. When the surface of the exposure lens is damaged, the quality of an image captured by the camera module 100 may be degraded. Thus, in order to inhibit and suppress the damage to the surface of the exposure lens, a cover glass is disposed on the exposure lens, and a coating layer is formed on the exposure lens. Further, in order to inhibit the damage to the surface of the exposure lens, the exposure lens may be implemented using a wear-resistant material that is stronger than that of other lenses of the lens unit.

Further, the outer diameter of each of the lenses L1 and L2 included in the first lens unit 110A may increase toward the lower side (for example, in a —Z-axis direction), but the embodiments are not limited thereto.

The light incident from the outside of the camera module 100 to the first lens unit 110 (i.e., 110A) may pass through the liquid lens unit 140 to be incident on the second lens unit 130 (i.e., 130A). The second lens unit 130 (i.e., 130A) may be implemented as a single lens or may also be implemented as two or more lenses arranged on the central axis to form the optical system. For example, as illustrated in FIG. 3A, the second lens unit 130A may include three lenses L3, L4, and L5, but this is illustrative and the number of the lenses included in the second lens unit 130 (i.e., 130A) may be two or less or four or more.

Further, the outer diameter of each of the lenses L3, L4, and L5 included in the second lens unit 130A may increase toward the lower side (for example, in a —Z-axis direction), but the embodiments are not limited thereto.

Further, unlike the liquid lens unit 140, the first lens unit 110 (i.e., 110A) and the second lens unit 130 (i.e., 130A) are solid lenses and may be implemented using glass or plastic, but in the embodiments, the first lens unit 110 (i.e., 110A) and the second lens unit 130 (i.e., 130A) are not limited to specific materials.

Further, the liquid lens unit 140 may include first to fifth regions A1, A2, A3, A4, and A5. In detail, the fourth region A4 and the fifth region A5 may be located on the outermost side of the camera module 100, and the first region A1, the second region A2, and the third region A3 may be arranged between the fourth region A4 and the fifth region A5. Further, the third region A3 may be disposed between the first region A1 and the second region A2. Further, the first region A1 may be disposed between the fourth region A4 and the third region A3, and the second region A2 may be disposed between the third region A3 and the fifth region A5.

In other words, the first region A1 and the second region A2 may be regions arranged inside openings of a side surface of the holder 120. The third region A3 may be a region between the first region A1 and the second region A2. Further, the fourth region A4 and the fifth region A5 are regions protruding from the openings of the holder 120 and regions arranged in openings outside the holder 120.

Hereinafter, the first adhesive member 162 and the second adhesive member 164 are described, and the liquid lens unit 140 will be described below.

The first adhesive member 162 may include first and second adhesive parts 162-1 and 162-2, and the second adhesive member 164 may include third and fourth adhesive parts 164-1 and 164-2. The adhesive parts may include an adhesive, an epoxy, or the like.

First, the first adhesive part 162-1 couples the holder 120 to an upper surface 140TS of the fourth region A4 of the liquid lens unit 140, and the third adhesive part 164-1 couples the holder 120 to an upper surface of the fifth region A5 of the liquid lens unit 140. Here, the upper surface 140TS of each of the fourth region A4 and the fifth region A5 of the liquid lens unit 140 is exemplified as an upper surface of a first connection substrate 141, but the embodiments are not limited thereto. For example, when the liquid lens unit 140 does not include connection substrates 141 and 144 or the spacer 143, an upper surface of the liquid lens unit 140 may be an upper surface of a liquid lens 142.

Alternatively, the holder 120 may include an upper holder disposed on the liquid lens unit 140 (or the liquid lens 142) and a lower holder disposed under the liquid lens unit 140 (or the liquid lens 142). Further, the holder 120 may include a side wall facing a side surface of the liquid lens 142 or the liquid lens unit 140. Each of the first adhesive part 162-1 and the third adhesive part 164-1 may couple the upper holder region 120U and the liquid lens unit 140. In this way, each of the first adhesive part 162-1 and the third adhesive part 164-1 couples the holder 120 and the liquid lens unit 140, and thus the liquid lens unit 140 may be fixed to the holder 120.

Further, the second adhesive part 162-2 may couple the holder 120 to a lower surface 140BS and a side surface of the fourth region A4 of the liquid lens unit 140. Here, it is exemplified that the lower surface 140BS of the liquid lens unit 140 is a lower surface of the second connection substrate 144, and the side surface of the liquid lens unit 140 is a side surface of the spacer 143, but the embodiments are not limited thereto. For example, when the liquid lens unit 140 does not include the first connection substrate 141 and the second connection substrate 144 or the spacer 143, the lower surface or side surface of the liquid lens unit 140 may be a lower surface or side surface of the liquid lens 142. Similarly, the fourth adhesive part 164-2 may couple the holder 120 to the lower surface 140BS and a side surface 140SS of the fifth region A5 of the liquid lens unit 140. Here, the lower surface 140BS of the liquid lens unit 140 may be the lower surface of the second connection substrate 144, and the side surface 140SS of the liquid lens unit 140 may be the side surface of the spacer 143, but the embodiments are not limited thereto. For example, when the liquid lens unit 140 does not include the connection substrates 141 and 144 or the spacer 143, the lower surface or side surface of the liquid lens unit 140 may be the lower surface or side surface of the liquid lens 142.

Further, each of the second adhesive part 162-2 and the fourth adhesive part 164-2 may couple the lower holder region 120D and the liquid lens unit 140. In this way, each of the second adhesive part 162-2 and the fourth adhesive part 164-2 couples the holder 120 and the liquid lens unit 140, and thus an opening of the holder 120 may be sealed. For example, the first adhesive part 162-1 and the second adhesive part 162-2 may be connected to each other, and the third adhesive part 164-1 and the fourth adhesive part 164-2 are connected to each other, thereby achieving the above sealing.

Although not illustrated, the third adhesive member 166 may be disposed to fill a separation space (or a gap) between an upper surface of the holder 120 and the first cover 170. Further, in some cases, the third adhesive member 166 may be omitted. In this case, the separation space between the upper surface of the holder 120 and the first cover 170 may be empty.

The embodiments are not limited to the above-described shapes of the first to third adhesive members 162, 164, and 166. That is, the first to third adhesive members 162, 164, and 166 may have various shapes as long as the interior of the holder 120 may be sealed so that foreign substances do not flow into the holder 120 through an opening of the holder 120 from the outside. For example, in a state in which the first adhesive member 162 and the second adhesive member 164 are arranged to seal the opening of the holder 120, when the third adhesive member 166 is disposed to seal the separation space between the upper surface of the holder 120 and the first cover 170, the third region A3 of the liquid lens unit 140 disposed in an inner space of the holder 120 may be sealed from the outside. Accordingly, in the camera module 100 according to an embodiment, the reliability can be improved, the degradation of optical performance can be inhibited, and a defective rate can be reduced even when there are foreign substances.

Further, the first adhesive part to the fourth adhesive part 162-1, 164-1, 162-2, and 164-2 may have various shapes. That is, the first adhesive part 162-1, the second adhesive part 162-2, the third adhesive part 164-1, and the fourth adhesive part 164-2 may have shapes corresponding to the shapes of the openings of the holder 120.

Further, adhesives may be disposed in the first region A1 and the second region A2 together with the fourth region A4 and the fifth region A5, but the embodiments are not limited thereto.

Further, the first cover 170 may be disposed to surround the holder 120, the liquid lens unit 140, the middle base 172, and a sensor base 178. Accordingly, the first cover 170 may be in contact with a shoulder-side upper surface 120S of the holder 120. In this case, when an upper surface 162S of each of the first adhesive part 162-1 and the third adhesive part 164-1 is located at a higher level than the shoulder-side upper surface 120S of the holder 120, the first cover 170 may be in contact with the upper surface 162S of each of the first adhesive part 162-1 and the third adhesive part 164-1 instead of the shoulder-side upper surface 120S of the holder 120. Accordingly, the first cover 170 may be unstably fixed to the holder 120. To inhibit this, the upper surface 120S of the holder 120 may be disposed so that the upper surface 120S and the upper surface 162S of the first adhesive part 162-1 are located at different levels from each other by a predetermined height. Similarly, the upper surface 120S of the holder 120 may be located at a higher level than the upper surface 164S of the third adhesive part 164-1 by a predetermined height.

Further, the height of the upper surface 120S of the holder 120 may be the same as the height of the upper surface 162S of the first adhesive part 162-1, and the height of the upper surface S120 of the holder 120 may be the same as the height of the upper surface 164S of the third adhesive part 164-1.

Further, hereinabove, the liquid lens unit 140 described when features of the first adhesive member 162 and the second adhesive member 164 are described includes the first and second connection substrates 141 and 144. However, the liquid lens unit 140 described when features of the first adhesive member 162 and the second adhesive member 164 are described above may not include the first and second connection substrates 141 and 144.

Further, the first cover 170 is disposed to surround the holder 120, the liquid lens unit 140, the third adhesive member 166, and the middle base 172 and thus may protect the holder 120, the liquid lens unit 140, the third adhesive member 166, and the middle base 172 from an external impact. In particular, the plurality of lenses forming the optical system can be protected due to the first cover 170.

Further, the first cover 170 may include an upper opening 170H formed in an upper surface thereof. Accordingly, the first lens unit 110 (i.e., 110A) disposed in the holder 120 may be exposed to external light.

Further, the middle base 172 may be disposed to surround a hole of the holder 120. Accordingly, the middle base 172 may include an accommodation hole 172H for accommodating the hole of the holder 120. The inner diameter (that is, the diameter of the accommodation hole 172H) of the middle base 172 may be greater than or equal to an outer diameter of the holder 120. Further, it is illustrated that the accommodation hole 172H of the middle base 172 and the hole of the holder 120 have circular shapes, but the embodiments are not limited thereto, and the accommodation hole 172H of the middle base 172 and the hole of the holder 120 may be changed into various shapes. Further, the middle base 172 may be mounted on the main substrate 150 while being spaced apart from a circuit element 151 on the main substrate 150.

Like the upper opening 170H of the first cover 170, the accommodation hole 172H may be formed at a location corresponding to a location of the image sensor 30 disposed in the camera module 100 near a central portion of the middle base 172.

Further, the camera module 100 may further include the sensor base 178 and a filter 176 and further include a circuit cover 154.

The filter 175 may filter the light passing through the first lens unit 110 (i.e., 110A), the liquid lens unit 140, and the second lens unit 130 (i.e., 130A) into a specific wavelength range. The filter 176 may be an infrared ray (IR) cut-off filter or an ultraviolet (UV) cut-off locking filter, but the embodiments are not limited thereto.

Further, the filter 176 may be disposed above the image sensor 30. The filter 176 may be disposed inside the sensor base 178. For example, the filter 176 may be disposed or mounted in an inner groove or step of the sensor base 178.

The sensor base 178 may be disposed below the middle base 172 and attached to the main substrate 150. The sensor base 178 may surround the image sensor 30 and protect the image sensor 30 from external foreign substances or an external impact.

Next, the main substrate 150 is disposed below the middle base 172 and may include a groove which the image sensor 30 is mounted on, is seated on, is in contact with, is fixed to, is temporarily fixed to, is supported by, is coupled to, or is accommodated in, the circuit element 151, a connection part (or a flexible printed circuit board (FPCB)) 152, and a connector 153.

In detail, the main substrate 150 may include a holder region in which the holder 120 is disposed and an element region in which a plurality of circuit elements 151 are arranged.

The main substrate 150 may be implemented as a rigid flexible printed circuit board (RFPCB) including the FPCB 152. The FPCB 152 may be bent for a space on which the camera module 100 is mounted.

Further, the circuit element 151 of the main substrate 150 may constitute a control module that controls the liquid lens unit 140 and the image sensor 30. Here, the control module will be described below.

Further, the circuit element 151 may include at least one of a passive element and an active element and may have various widths and heights. The circuit element 151 may be provided as a plurality of circuit elements 151 and may protrude outward while having a height that is greater than the height of the main substrate 150. The plurality of circuit elements 151 may be arranged so as not to overlap the holder 120 in a direction parallel to the optical axis LX. For example, the plurality of circuit elements 151 may each include a power inductor, a gyro sensor, and the like, but the embodiments are limited to a specific type of the circuit elements 151.

The circuit cover 154 may be disposed to cover the circuit elements 151. Accordingly, the circuit cover 154 may protect the circuit elements 151 arranged on the main substrate 150 from an external impact. Further, to this end, the circuit cover 154 may include an accommodation space for accommodating the circuit element 151 to be covered by the circuit cover 154 in consideration of the shape and location of the circuit element 151 disposed on the main substrate 150. Further, the circuit cover 154 may perform an electromagnetic shielding function.

The image sensor 30 may function to convert, into image data, the light passing through the first lens unit 110 (i.e., 110A), the liquid lens unit 140, and the second lens unit 130 (i.e., 130A) of the lens assemblies 110, 120, 130, 140, 162, and 164. In more detail, the image sensor 30 may convert the light into an analog signal through a pixel array including a plurality of pixels and synthesize a digital signal corresponding to the analog signal to generate the image data.

Referring to FIGS. 3 and 4, the liquid lens unit 140 may include the first connection substrate (or an individual electrode connection substrate) 141, the liquid lens (or a liquid lens body) 142, the spacer 143, and the second connection substrate (or a common electrode connection substrate) 144.

The first connection substrate 141 may electrically connect a plurality of first electrodes (not illustrated) included in the liquid lens 142 to the main substrate 150 and may be disposed on the liquid lens 142. The first connection substrate 141 may be provided as an FPCB.

Further, the first connection substrate 141 may be electrically connected to an electrode pad 150-1 formed on the main substrate 150 through a connection pad 141-1 electrically connected to each of the plurality of first electrodes. To this end, after the liquid lens unit 140 is inserted into the inner space of the holder 120, the first connection substrate 141 is bend in a —Z-axis direction toward the main substrate 150, and then the connection pad 141-1 and the electrode pad 150-1 may be electrically connected using a conductive epoxy. In another embodiment, the first connection substrate 141 may be connected to a first conductive holder surface electrode, which is disposed, formed, or applied on a surface of the holder 120, and may be electrically connected to the main substrate 150 through the first conductive holder surface electrode disposed on the surface of the holder 120, but the embodiments are not limited thereto.

The second connection substrate 144 may electrically connect a second electrode (not illustrated) included in the liquid lens 142 to the main substrate 150 and may be disposed under the liquid lens 142. The second connection substrate 144 may be implemented as an FPCB or a single metal substrate (conductive metal plate).

Further, the second connection substrate 144 may be electrically connected to an electrode pad formed on the main substrate 150 through a connection pad electrically connected to the second electrode. To this end, after the liquid lens unit 140 is inserted into the inner space of the holder 120, the second connection substrate 144 may be bent in a —Z-axis direction toward the main substrate 150. In another embodiment, the second connection substrate 144 may be connected to a conductive surface electrode, which is disposed, formed, or applied on the surface of the holder 120, and may be electrically connected to the main substrate 150 through the conductive surface electrode disposed on the surface of the holder 120, but the embodiments are not limited thereto.

The liquid lens 142 may include a cavity CA. Further, an opening area of the cavity CA in a direction in which the light is incident may be smaller than an opening area thereof in an opposite direction. Alternatively, the liquid lens 142 may be disposed so that an inclined direction of the cavity CA is reversed. That is, the opening area of the cavity CA in the direction in which the light is incident may be also greater than the opening area thereof in an opposite direction. Further, when the liquid lens 142 is disposed so that the inclined direction of the cavity CA is reversed, according to the inclined direction of the liquid lens 142, the arrangement of the entirety or a part of the components included in the liquid lens 142 may be changed or only the inclined direction of the cavity CA is changed and the arrangement of the remaining components may not be changed.

The spacer 143 may be disposed to surround the liquid lens 142 and protect the liquid lens 142 from an external impact. To this end, the spacer 143 may have a shape which the liquid lens 142 may be mounted in, seated on, in contact with, fixed to, temporarily fixed to, supported by, coupled to, or disposed in.

For example, the spacer 143 may include a hollow 143H accommodating the liquid lens 142 and a frame surrounding the hollow 143H formed in the middle thereof. In this way, the spacer 143 may have a quadrangular planar shape having a hollow center (hereinafter, referred to as a "☐" shape), but the embodiments are not limited thereto.

Further, the spacer 143 may be disposed between the first connection substrate 141 and the second connection substrate 144 and may protrude from the opening of the holder 120.

Further, the liquid lens 142 may include a plurality of different liquids LQ1 and LQ2, first to third plates 147, 145, and 146, first and second electrodes E1 and E2, and an insulating layer 148. The liquid lens 142 may further include an optical layer 190.

Further, the plurality of liquids LQ1 and LQ2 may be accommodated in the cavity CA and may include a first conductive liquid LQ1 and a second non-conductive liquid (or an insulating liquid) LQ2. Further, the first liquid LQ1 and the second liquid LQ2 are not mixed with each other, and an interface BO may be formed at a portion at which the first liquid LQ1 is in contact with the second liquid LQ2. Further, the second liquid LQ2 may be disposed on the first liquid LQ1, but the embodiments are not limited thereto.

Further, in a cross-sectional shape of the liquid lens 142, edges of the first and second liquids LQ1 and LQ2 may be thinner than a central portion thereof. However, the embodiments are not limited.

The inner surface of the first plate 147 may form a side wall i of the cavity CA. The first plate 147 may include upper and lower openings having a preset inclined surface. That is, the cavity CA may a region surrounded by the inclined surface of the first plate 147, the second plate 145, and the third plate 146.

Further, according to the embodiments, the size (or area or width) O1 of the upper opening may be greater than the size (or area or width) O2 of the lower opening. Here, the size of each of the upper opening and the lower opening may be a cross-sectional area in a horizontal direction (for example, in an X-axis direction and a Y-axis direction). For example, further, the size of the opening may be a radius when the cross-section of the opening has a circular shape and may be a length of a diagonal line when the cross-section of the opening is square. Further, the diameter of the opening may be changed according to a field of view (FOV) required by the liquid lens 142 or a role that the liquid lens 142 should perform in the camera module 100.

Further, each of the openings may have a shape of a hole having a circular cross-section, and the inclined surface may have an inclined. The interface BO may move along an inclined surface of the cavity CA by the driving voltage.

Further, as described above, the first liquid LQ1 and the second liquid LQ2 may fill, be accommodated, and be arranged in the cavity CA. Further, the cavity CA is a portion through which the light passing through the first lens unit 110 (i.e., 110A) passes. Further, the first plate 147 is located outside the cavity CA and thus may be formed of a transparent material. As well, the first plate 147 may also include impurities so that the light does not easily pass therethrough.

Further, electrodes may be arranged on one surface and the other surface of the first plate 147. The plurality of first electrodes E1 may be arranged to be spaced apart from the second electrode E2 and may be arranged on the one surface (for example, an upper surface, a side surface, and a lower surface) of the first plate 147. The second electrode E2 may be disposed in at least a portion of the other surface (for example, a lower surface) of the first plate 147 and may be in direct contact with the first liquid LQ1.

Further, the first electrodes E1 may be n electrodes (hereinafter, referred to as "individual electrodes") and the number of the second electrodes E2 may be one (hereinafter, referred to as a "common electrode"). Here, n may be an integer of two or more. Here, a case in which the number of the first electrodes E1 is four and the number of the second electrodes E2 is one will be described below. That is, opposite ends electrically connected to the liquid lens 142 may be one of the plurality of first electrodes E1 and the second electrode E2.

Further, a portion (that is, an electrode sector of the second electrode E2) of the second electrode E2 disposed on the other surface of the first plate 147 may be exposed to the first liquid LQ1 having conductivity.

Each of the first and second electrodes E1 and E2 may be made of a conductive material. For example, the first electrode E1 and the second electrode E2 may be made of metal.

Further, the second plate 145 may be disposed on one surface of the first electrode E1. That is, the second plate 145 may be disposed on the first plate 147. In detail, the second plate 145 may be disposed on an upper surface of the first electrode E1 and the cavity CA.

The third plate 146 may be disposed on one surface of the second electrode E2. That is, the third plate 146 may be disposed under the first plate 147. In detail, the third plate 146 may be disposed under a lower surface of the second electrode E2 and the cavity CA.

The second plate 145 and the third plate 146 may be arranged to be opposite to each other with the first plate 147 interposed therebetween. Further, at least one of the second plate 145 and the third plate 146 may be omitted.

At least one of the second and third plates 145 and 146 may have a quadrangular planar shape. The third plate 146 may be in contact with and adhere to a joining region at an edge of the first plate 147.

The second plate 145 and the third plate 146 are regions through which the light passes and may be formed of a light-transmitting material. For example, the second and third plates 145 and 146 may be made of glass and may be formed of the same material for convenience of processing. Further, edges of each of the second and third plates 145 and 146 may have a quadrangular shape, but the embodiments are not necessarily limited thereto.

Further, the second plate 145 may allow the light incident from the first lens unit 110 (i.e., 110A) to move into the cavity CA of the first plate 147.

Further, the third plate 146 may allow the light passing through the cavity CA of the first plate 147 to move to the second lens unit 130 (i.e., 130A). The third plate 146 may be in direct contact with the first liquid LQ1.

According to the embodiment, the third plate 146 may have a diameter greater than a diameter of a wider opening among the upper opening and the lower opening of the first plate 147. Further, the third plate 146 may include a peripheral region spaced apart from the first plate 147.

For example, an actual effective lens region of the liquid lens 142 may be smaller than a diameter (for example, O2) of a wider opening among the upper opening and the lower opening of the first plate 147. That is, when a radius of a narrow range with respect to the center of the liquid lens 142 is used as a path along which the light is actually transmitted, a diameter O3 of a central region of the third plate 146 may be smaller than a diameter (for example, O2) of a wider opening among a third opening and a fourth opening of the first plate 147.

The insulating layer 148 may be disposed to cover a portion of a lower surface of the second plate 145 in an upper region of the cavity CA. That is, the insulating layer 148 may be disposed between the second liquid LQ2 and the second plate 145.

Further, the insulating layer 148 may be disposed to cover a portion of the first electrode E1 constituting a side wall of the cavity CA. Further, the insulating layer 148 may be disposed on the lower surface of the first plate 147 to cover a portion of the first electrode E1, the first plate 147, and the second electrode E2. Accordingly, contact between the first electrode E1 and the first liquid LQ1 and contact between the first electrode and the second liquid LQ2 may be cut off by the insulating layer 148.

The insulating layer 148 may cover one electrode (for example, the first electrode E1) among the first electrode E1 and the second electrode E2, may expose a portion of the other electrode (for example, the second electrode E2) thereof, and thus may allow electrical energy to be applied to the first liquid LQ1 having conductivity.

Meanwhile, the optical layer 190 may be disposed on one surface of at least one of the second plate 145 and the third plate 146. For example, the optical layer 190 may be disposed on at least one of an upper side or a lower side of the second plate 145, may be disposed on at least one of an upper side and a lower side of the third plate 146, or may be disposed on at least one of the upper sides and the lower sides of the second and third plates 145 and 146.

Further, although the liquid lens 142 and the optical layer 190 are illustrated separately from each other, the optical layer 190 may be a component of the liquid lens 142. Further, the optical layer 190 is illustrated as a single layer, but this is for displaying the existence of the optical layer 190. That is, the optical layer 190 may be a single layer or multiple layers.

Further, the optical layer 190 may include at least one of an UV cut-off layer, an anti-reflective layer, and an IR cut-off layer. The optical layer 190 may be disposed to overlap the image sensor 30 in a direction of the optical axis LX (that is, a Z axis) or in a direction parallel to the direction of the optical axis. Further, the optical layer 190 may be disposed in the third region A3 of the liquid lens unit 140. For example, the UV cut-off layer may cut off UV rays, particularly, light in a UV-A region. The UV cut-off layer may be disposed in a region in which the light incident on the liquid lens 142 and cut off the UV rays, particularly, the light in the UV-A region, which may be transmitted from the first lens unit 110 (i.e., 110A). UV-C has a relatively short wavelength and has low penetration power, and thus most of the UV-C is cut off by the ozone layer. UV-B is cut off by general glass. However, the UV-A passes through general glass, and thus a separate cut-off layer may be particularly required. Further, the UV cut-off layer may include at least one of $TiO_2$, $SiO_2$, avobenzone, butylmethoxy dibenzoylmethane, oxybenzone, benzophenone-3, cinnamate, and mexoryl.

Further, the anti-reflective layer may serve to inhibit the light from being reflected by the second plate 145 or the third plate 146, may improve light transmittance that may be decreased due to a Fresnel loss in the liquid lens 142, and may inhibit a decrease in night visibility of the liquid lens 142. In particular, although not illustrated, the anti-reflective layer may be disposed on an inclined surface and a lower surface of the insulating layer 148, and the anti-reflective layer may inhibit a decrease in the quality of the light that is reflected and transmitted to the image sensor 30.

Further, the IR cut-off layer may cut off the light in an IR region. The IR cut-off layer may inhibit the IR from being incident on the liquid lens 142 from the outside to remove thermal stains on an image and may reduce reflection of light from the surface of the liquid lens 142 to inhibit degradation of night visibility.

Further, at least one of the UV cut-of layer, the anti-reflective layer, and the IR cut-off layer may be disposed in at least one of a light input part and a light output part of the camera module 100 according to the embodiment.

Further, according to the embodiment, the optical layer 190 may have a coated form or a film form. For example, the anti-reflective layer of the optical layer 190 may be formed by coating at a low temperature in a spraying method or the like.

FIGS. 5A to 5E are views for describing a method of driving the liquid lens unit. Hereinafter, it will be described that a voltage is applied between the first electrode and the second electrode.

Figure 5A:
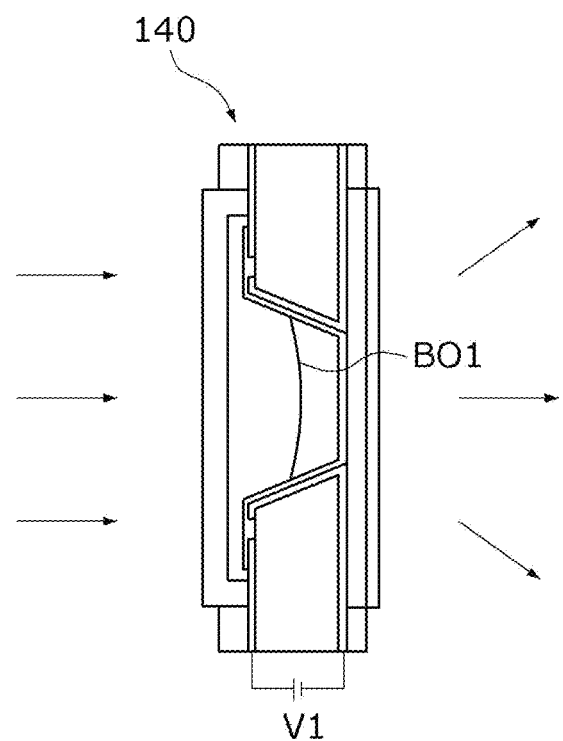
FIGS. 5A to 5E are views for describing a method of driving the liquid lens unit.

First, in FIG. 5A, a first voltage V1 is applied to the liquid lens unit 140, and thus an interface BO1 of the liquid lens may be convex in a light propagation direction. Accordingly, it is exemplified that the liquid lens unit operates as a concave lens. Further, in FIG. 5B, a second voltage V2 greater than the first voltage V1 is applied to the liquid lens unit 140, and thus an interface BO2 of the liquid lens may be perpendicular to the light propagation direction. Accordingly, it is exemplified that, in the liquid lens unit, the light propagation direction is not changed. Further, in FIG. 5C, a third voltage V3 greater than the second voltage V2 is applied to the liquid lens unit 140, and thus an interface BO3 of the liquid lens may be convex in a direction opposite to the light propagation direction. Accordingly, it is exemplified that the liquid lens unit 140 operates as a convex lens. In this case, when the first voltage V1 to the third voltage V3 are applied, the interfaces BO1, BO2, and BO3 of the liquid lens in the liquid lens unit 140 may have different curvatures.

That is, in the liquid lens unit 140 according to the embodiment, it is exemplified that the curvature or diopter of the liquid lens of the liquid lens unit is changed according to the level of the applied voltage, but the embodiments are not limited thereto, and the curvature or diopter of the liquid lens may be changed according to a pulse width of an applied pulse.

Figure 5B:
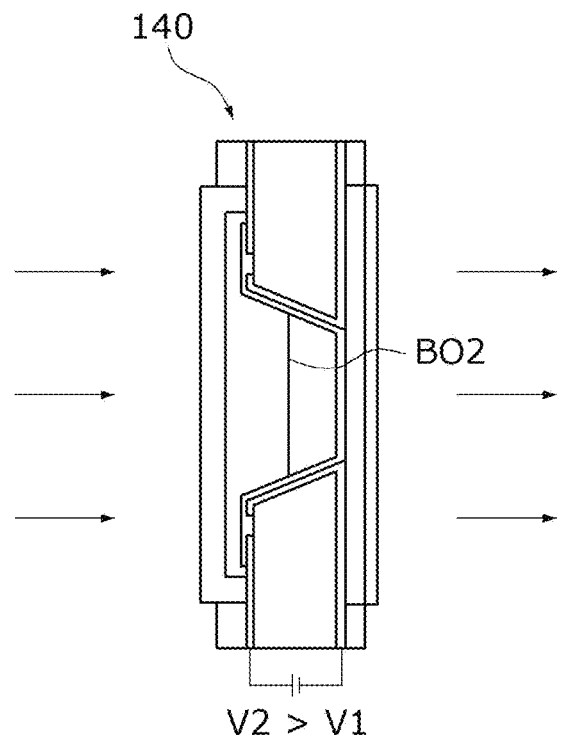
Figure 5C:
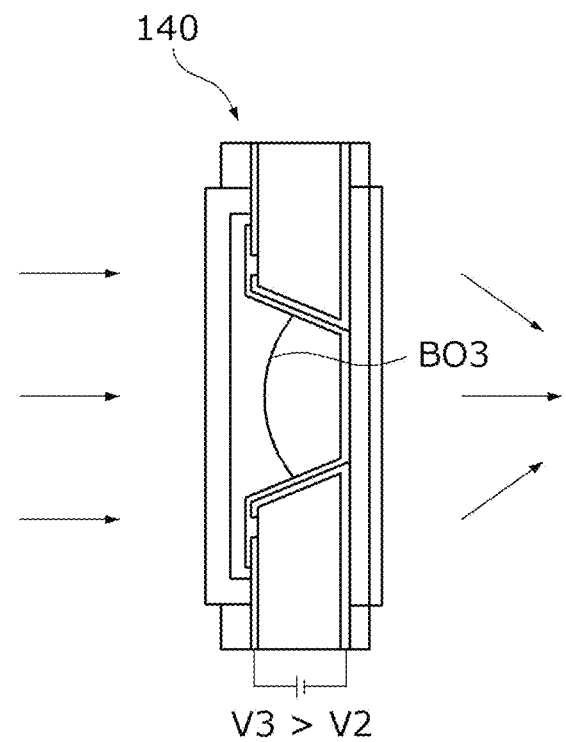
Figure 5D:
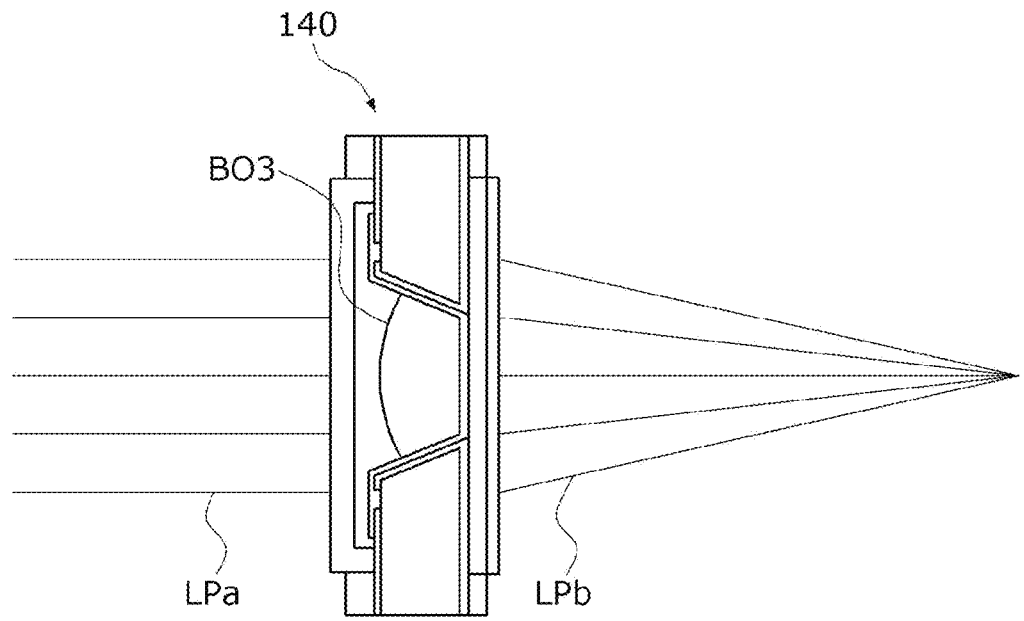

Further, in FIG. 5D, it is exemplified that the liquid lens of the liquid lens unit 140 has the same interface BO3 as that of FIG. 5C, and thus liquid lens unit 140 operates as a convex lens. Accordingly, according to FIG. 5D, an incident light LPa is concentrated, and a corresponding output light LPb is output.

Figure 5E:
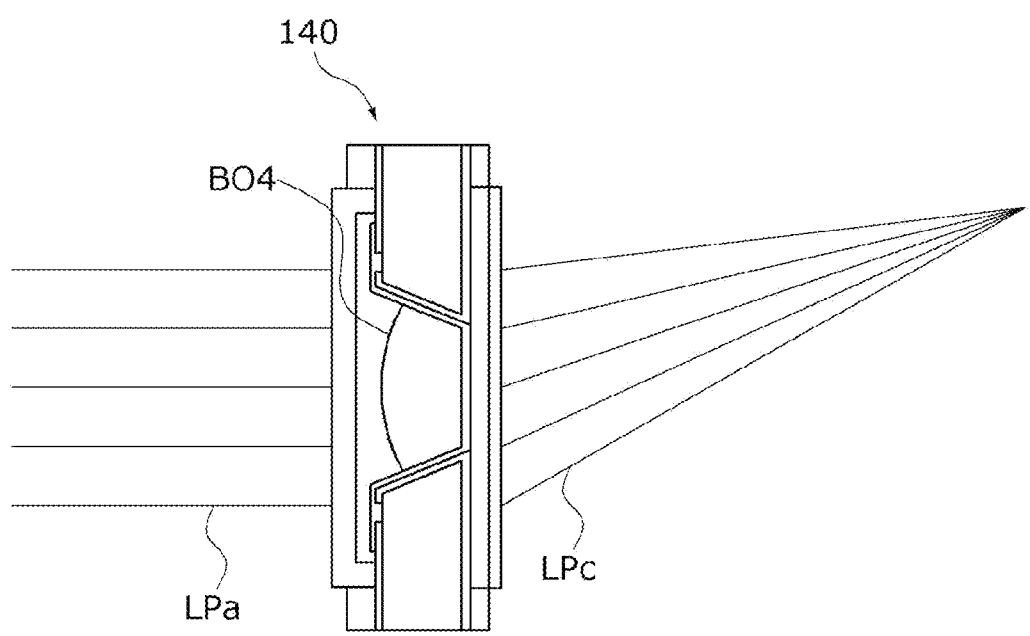

Further, FIG. 5E illustrates a state in which, as the liquid lens in the liquid lens unit 140 has an asymmetrical curved surface (for example, the interface is convex in the direction opposite to the light propagation direction from the above), the light propagation direction is changed to one side (for example, an upper side). That is, according to FIG. 5D, an incident light LPa is concentrated to the upper side, and a corresponding output light LPb is output.

Figure 6:
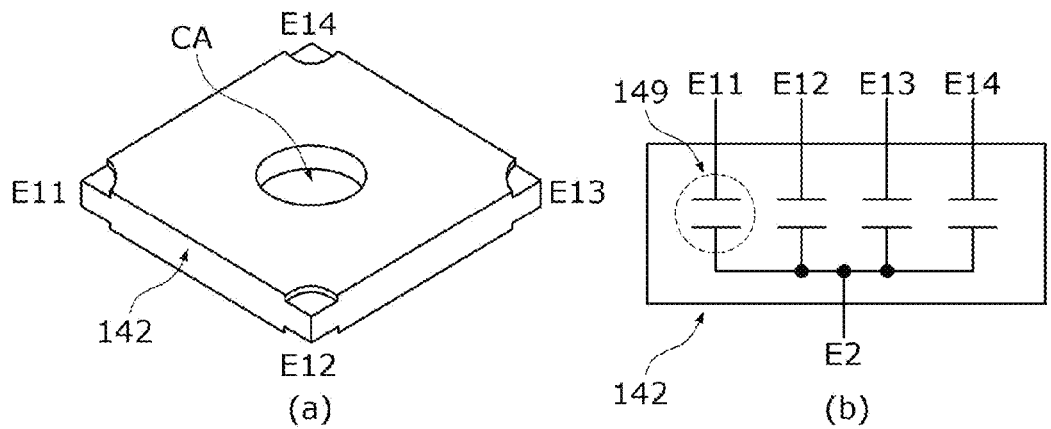
FIG. 6 is a view for describing the liquid lens unit of which an interface is adjusted according to a driving voltage.

FIG. 6 is a view for describing the liquid lens unit of which an interface is adjusted according to a driving voltage.

Referring to FIG. 6, FIG. 6A describes the liquid lens unit, and FIG. 5B describes an equivalent circuit of the liquid lens unit.

Referring to FIG. 6A, a lens 28 of which a focal length is adjusted according to the driving voltage may receive a voltage through individual terminals E11, E12, E13, and E14 having the same angular distance and arranged in four different directions. The individual terminals may be arranged to have the same angular distance with respect to a central axis of the liquid lens and may include four individual terminals. The four individual terminals may each be arranged at one of four corners of the liquid lens. When the voltage is applied through the individual terminals E11, E12, E13, and E14, the interface of the liquid lens may be deformed by the driving voltage formed by an interaction between the applied voltage and a voltage applied to a common terminal C0 described below.

Further, referring to FIG. 6B, one side of the liquid lens 142 may receive operating voltages from the different individual terminals E11, E12, E13, and E14, and the other side thereof may be electrically connected to the common terminal C0. Further, the common terminal C0 and a plurality of capacitors 149 may be connected. Further, the plurality of capacitors 149 included in the equivalent circuit may have a small capacitance of about several tens to 200 pF. A terminal of the liquid lens may be called an electrode sector or a sub electrode.

Figure 7A:
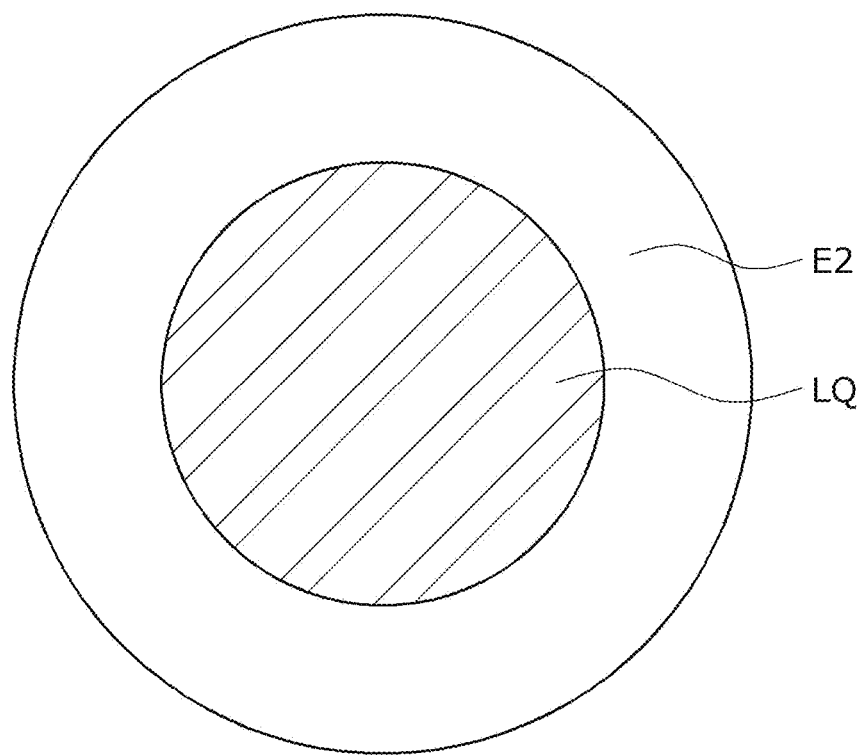
FIGS. 7A and 7B are views illustrating a structure of the liquid lens unit.
Figure 7B:
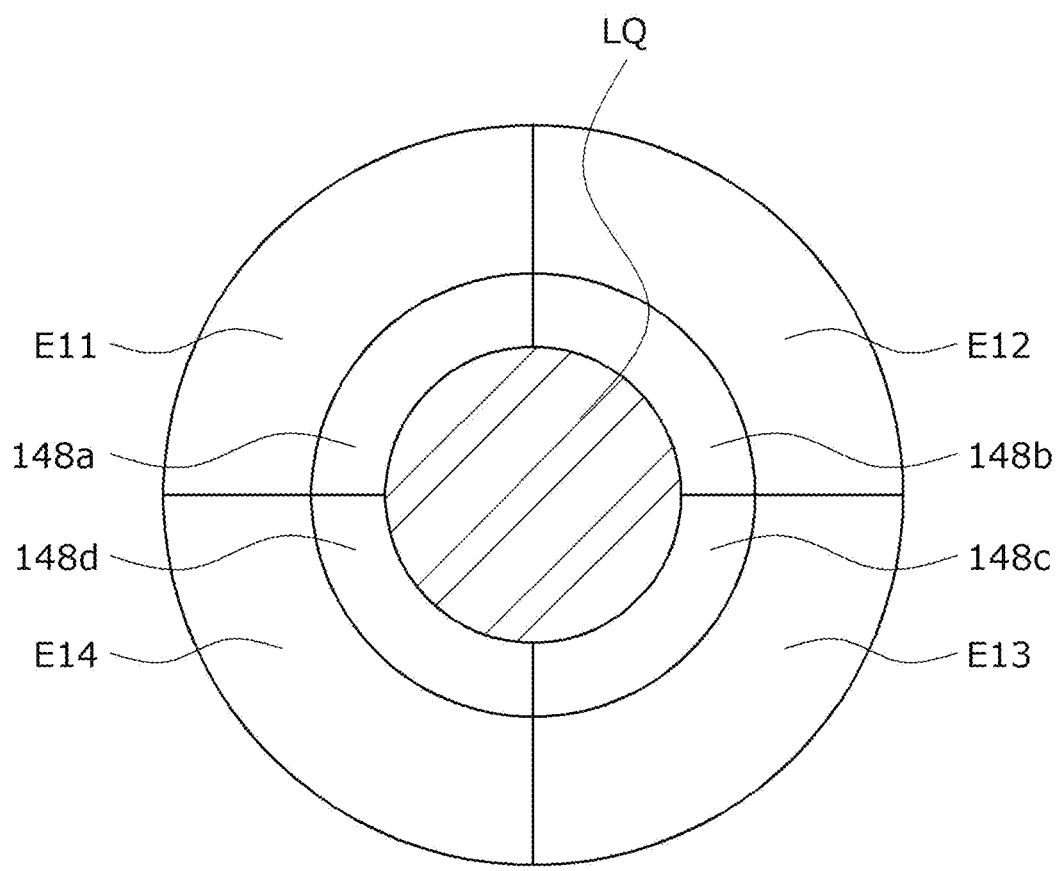

FIGS. 7A and 7B are views illustrating a structure of the liquid lens unit.

Referring to FIG. 7A, the common electrode E2 (corresponding to the second electrode) may be disposed on one side of the liquid lens unit 140. In this case, the common electrode E2 may be disposed in a tube shape, and a liquid LQ may be disposed in a lower region of the common electrode E2, particularly, in a region corresponding to a hollow.

Meanwhile, although not illustrated in the drawings, the insulating layer may be disposed between the common electrode E2 and the liquid to insulate the common electrode E2.

Further, as illustrated in FIG. 7B, a plurality of first electrodes E11 to E14 may be arranged below the common electrode, particularly, below the liquid LQ. In particular, the plurality of first electrodes E11 to E14 may be arranged to surround the liquid LQ.

Further, a plurality of insulating layers 148a to 148d for insulation may be arranged between the plurality of first electrodes E11 to E14 and the liquid LQ.

Figure 8:
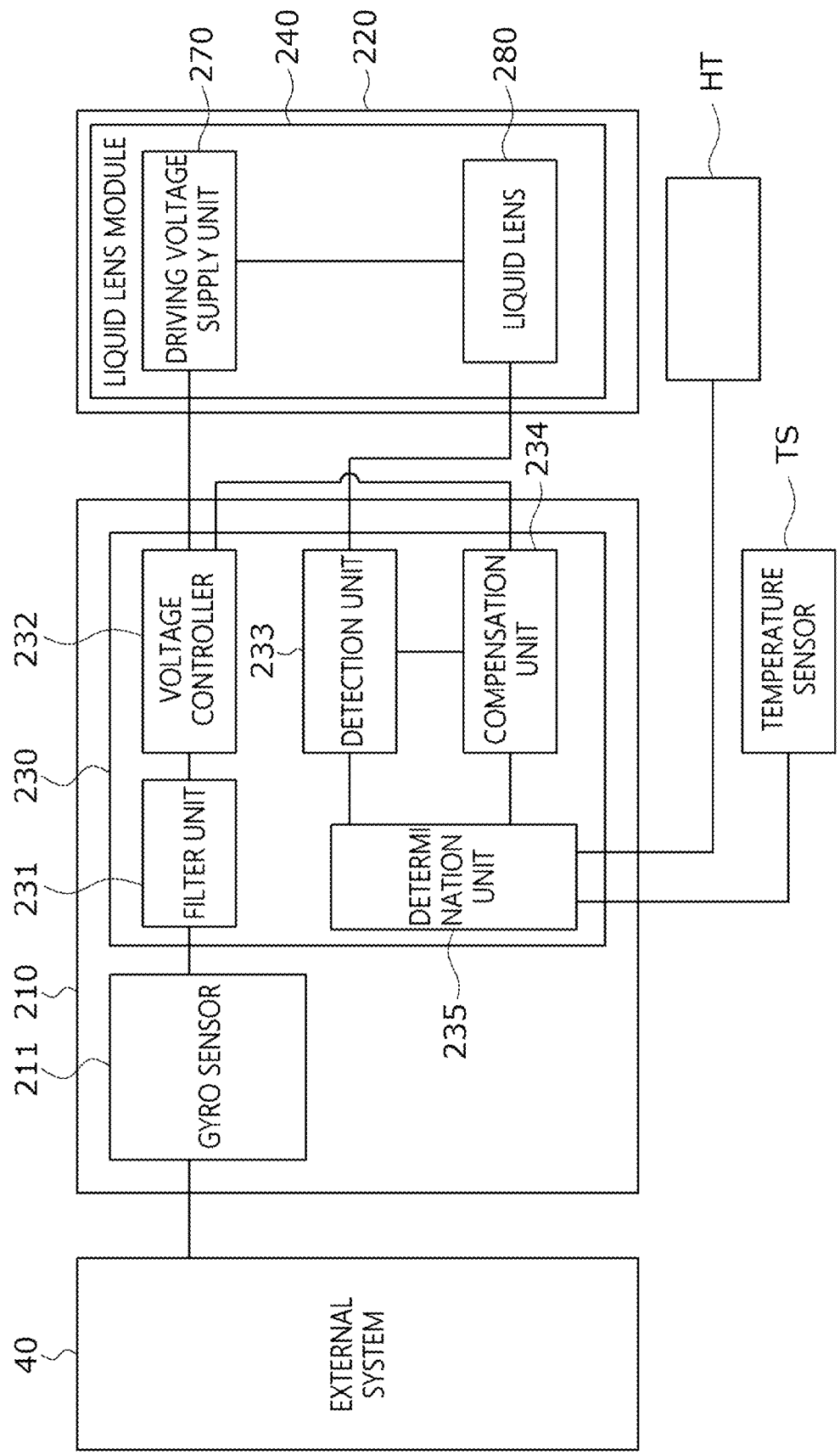
FIG. 8 is a block diagram of a camera module according to an embodiment.

FIG. 8 is a block diagram of a camera module according to an embodiment.

Referring to FIG. 8, a camera module 200 may include a control circuit 210 and a lens assembly 220. The control circuit 210 may correspond to the control circuit 20, and the lens assembly 220 may is the lens assembly 10, that is, may correspond to the lens assemblies 110, 120, 130, 140, 162, and 164.

Further, the control circuit 210 may include a gyro sensor 211 and a controller 230 and may control an operation of a liquid lens module 240 including a liquid lens 280.

Further, the controller 230 may have a configuration for performing an auto-focusing (AF) function or an optical Image stabilization (OIS) function and may control the liquid lens 280 included in the lens assembly 220 using a request of a user or a detection result (for example, a detection signal of the gyro sensor 211). Here, the liquid lens 280 may correspond to the liquid lens 142.

The gyro sensor 211 may detect an angular velocity and may be located inside the controller 230. However, the embodiments are not limited to the above location.

In detail, the controller 230 may include a voltage controller 232, a detection unit 233, and a compensation unit 234. As described above, the gyro sensor 211 may be an independent part that is not included in the controller 230 or may be included in the controller 230.

The gyro sensor 211 may detect, for example, the angular velocity of movement in two directions such as a yaw axis and a pitch axis in order to compensate for vertical and horizontal hand shaking of the optical device. The gyro sensor 211 may generate a motion signal having information on the detected angular velocity and provide the generated motion signal to the voltage controller 232.

A filter unit 231 may filter the signal received from the gyro sensor 211. That is, the filter unit 231 may extract only a desired frequency band by removing a noise component. For example, in order to implement the OIS function, the filter unit 231 may extract only a desired frequency band by removing a high-frequency noise component from the motion signal using a low pass filter (LPF).

Further, the voltage controller 232 may calculate the driving voltage corresponding to a shape that the liquid lens 280 of the liquid lens module 240 should have.

In detail, the voltage controller 232 may receive information (that is, information on a distance from an object) for the AF function from an internal unit (for example, the image sensor 30) or an external unit (for example, a distance sensor or an application processor) of the optical device or the camera module 200 and may calculate, through the information on the distance, the driving voltage corresponding to the shape that the liquid lens 280 should have according to a focal length at which the liquid lens 280 is focused on the object.

Alternatively, the voltage controller 232 may obtain a driving voltage code corresponding to the calculated driving voltage with reference to a driving voltage table and output the obtained driving voltage code to the lens assembly 220 (for example, a driving voltage supply unit 270). In this case, the voltage controller 232 may have the driving voltage table in which the driving voltage code is mapped with a driving voltage to generate the driving voltage. However, the embodiments are not limited to this location, and thus the voltage controller 232 and the driving voltage supply unit 270 may be located inside the liquid lens module or the camera module.

Alternatively, the voltage controller 232 may generate a driving voltage having an analog form corresponding to the driving voltage code on the basis of the provided driving voltage code having a digital form and may provide the generated driving voltage to the lens assembly 220.

In the embodiment, the voltage controller 232 may output the driving voltage corresponding to the shape of the interface of the liquid lens 280 in response to a first driving signal and a second driving signal that are voltage codes having a data type (for example, a digital type). A third driving signal and a fourth driving signal, which will be described below, may correspond to the above-described voltage code. The first driving signal, which is a signal received from the external system 40, may be, for example, an electrical signal provided to the camera module so that the external system that is a terminal has a diopter desired for the interface of the liquid lens in the camera module or may be a signal corresponding to the electrical signal.

Further, the voltage controller 232 may further include a voltage booster that receives a supply voltage (for example, a voltage supplied from a separate power circuit) and increase a voltage level, a voltage stabilizer for stabilizing output of the voltage booster, and a switching unit for selectively supplying the output of the voltage booster to each terminal of the liquid lens 280.

Here, the switching unit may include a configuration of a circuit called an H bridge. A high voltage output from the voltage booster may be applied to a power supply voltage of the switching unit. The switching unit may selectively supply the applied power supply voltage and the ground voltage to opposite ends of the liquid lens 280.

Further, as described above, for driving, the liquid lens 280 includes the four first electrodes including four electrode sectors, the first connection substrate, the one second electrode, and the second connection substrate. The opposite ends of the liquid lens 280 may be any one of the plurality of first electrodes and the second electrode. Further, the opposite ends of the liquid lens 280 may be any one of the four electrode sectors of the four first electrodes and the one electrode sector of the second electrode.

Accordingly, a voltage in the form of a pulse having a preset width may be applied to each of the electrode sectors of the liquid lens 280. Further, the driving voltage, which is a difference between voltages applied to the first electrodes and the second electrode, may be applied to the liquid lens 280.

In the embodiment, in order to control the driving voltage applied to the liquid lens 280 according to the driving voltage code having a digital form, the voltage controller 232 may generate the driving voltage having an analog form corresponding to the driving voltage code when the voltage booster controls the increased voltage level and the switching unit controls a phase of a pulse voltage applied to the common electrode and the individual electrodes. That is, the controller 230 may control a voltage applied to each of the first electrodes and the second electrode.

Further, the control circuit 210 may further include a connector (not illustrated) that performs a communication function or an interface function of the control circuit 210. For example, for communication between the control circuit 210 using an inter-integrated circuit (I2C) communication method and the lens assembly 220 using a mobile industry processor interface (MIPI) communication method, the connector may perform communication protocol conversion. Further, the connector may receive power form an external unit (for example, a battery) and supply power required for operating the controller 230 and the lens assembly 220. In this case, the connector may correspond to the connector 153 illustrated in FIG. 2.

Next, the detection unit 233 may detect the first driving signal applied to the liquid lens 280 to adjust the interface of the liquid lens 280. In this case, as described above, the first driving signal may be the driving voltage code, and this may be obtained from the capacitor 149 (see FIG. 6). In the embodiment, the detection unit 233 may detect a voltage value through a value of the capacitor in the liquid lens 280 and convert the detected voltage value into a digital form to detect the above-described driving voltage code. Further, the first driving signal may correspond to each voltage applied to the plurality of individual terminals of the liquid lens 280 or an average voltage thereof.

However, as described above, the first driving signal may be the same as a driving signal (for example, a digital signal) received from the external system 40 to adjust the interface of the liquid lens 280. However, as will be described below, it should be understood that, when compensation with a temperature is continuously performed, the first driving signal may correspond to a driving signal that previously adjusts the interface of the liquid lens.

That is, in the present embodiment, the first driving signal is a driving code corresponding to the driving voltage provided to the driving voltage supply unit 270 or the liquid lens 280 (when bypassing) when the interface of the liquid lens 280 is deformed to a desired diopter from the external system 40 including a control device or a controller in a mobile terminal irrespective of the temperature. Accordingly, since the interface of the liquid lens 280 is adjusted by the first driving signal, the liquid lens 280 may be in a state of not having the desired diopter on which the deformation according to the temperature is reflected.

Accordingly, the compensation unit 234 may generate the second driving signal for re-adjusting the interface of the liquid lens 280 by compensating the first driving signal with the temperature.

First, a temperature sensor TS may detect the temperature (Celsius or like) of the liquid lens 280. The temperature sensor TS may include various elements such as a thermistor. Further, the temperature sensor TS may be located inside the liquid lens module 240, inside the controller 230, or outside the camera module. Accordingly, the temperature sensor TS may detect the temperature of the liquid lens 280, the temperature of the liquid lens module 240, or the temperature of the camera module. However, in the embodiment, a case in which the temperature of the liquid lens 280 is detected will be described below.

The determination unit 235 may compare the temperature received from the temperature sensor TS with a target temperature to provide a heating signal to a heater HT that adjusts the temperature of the liquid lens 280 or provide the temperature to the compensation unit 234.

In detail, when the temperature received from the temperature sensor TS is lower than the target temperature, the determination unit 235 may provide the heating signal to the heater HT that adjusts the temperature of the liquid lens 280. Accordingly, the heater HT may supply energy to the liquid lens module 240 or the liquid lens 280 by the heating signal. Accordingly, the liquid lens 280 may have a temperature at which a change in the interface or a change in the diopter according to the temperature is minimized. Accordingly, in the camera module according to the embodiment, even when the temperature is changed, the change in the diopter is minimized, and thus spatial resolution may be improved. In this case, the heater HT may be located inside the camera module to provide the temperature to the liquid lens 280. In particular, the heater HT may be located inside or outside the liquid lens module 240. Further, the heating signal may be a driving voltage or current for driving the heater HT, and the following description will be based on a case in which the heating signal is a current.

Further, when the temperature received from the heater sensor TS is lower than a predetermined ratio of the target temperature, the determination unit 235 may provide a heating signal at a first electrical level to the heater HT.

Furthermore, when the temperature received from the heater sensor TS is higher than the predetermined ratio of the target temperature and lower than the target temperature, the determination unit 235 may provide a heating signal at a second electrical level to the heater HT.

In this case, the magnitude of the first electrical level may be greater than the magnitude of the second electrical level. In other words, the first electrical level and the second electrical level, which are driving currents provided to the heater HT, may correspond to the intensity of energy generated from the heater HT. That is, heat generated from the heater HT by the first electrical level may be higher than heat generated from the heater HT by the second electrical level. Further, the predetermined ratio is a value for the target temperature, and may be in the range of 0% to 100%. Accordingly, the camera module according to the embodiment may differentially adjust the temperature in response to the temperature of the liquid lens. Accordingly, the change in the interface of the liquid lens for the change in the temperature may be finely adjusted.

Further, when the temperature of the liquid lens received from the temperature sensor TS is higher than the target temperature, the determination unit 235 may provide the temperature received from the temperature sensor TS to the compensation unit 234. Accordingly, the compensation unit 234 may generate the second driving signal for re-adjusting the interface of the liquid lens 280 by compensating the first driving signal with the temperature.

In addition, even when the temperature received from the temperature sensor TS is lower than the target temperature, the determination unit 235 may provide the temperature received from the temperature sensor TS to the compensation unit 234, and at the same time, provide the heating signal to the heater HT. However, hereinafter, description will be based on a case in which, when the temperature received from the temperature sensor TS is lower than the target temperature, the determination unit provides only the heating signal to the heater HT.

In the embodiment, the compensation unit 234 may include a first input unit, a second input unit, a data unit, a first calculation unit, and a second calculation unit.

First, the first input unit may receive the above-described first driving signal. In the embodiment, the first input unit may receive the first driving signal from the detection unit 233. That is, the first input unit may receive the first driving signal detected by the detection unit 233, that is, the driving code for the desired diopter. In other words, the first input unit may receive the first driving signal to receive initial diopter information applied from the external system 40.

The second input unit may receive the temperature of the liquid lens. That is, the second input unit may be connected to the temperature sensor TS to receive the temperature of the liquid lens 280 from the temperature sensor TS.

The data unit may store a plurality of third driving signals for each temperature with respect to a first diopter of the liquid lens 280 and a plurality of fourth driving signals for each temperature with respect to a second diopter of the liquid lens 280. In this case, the first diopter and the second diopter are different and refer to a diopter of the interface of the liquid lens.

In other words, the data unit may store two or more driving signals for each temperature with respect to two or more of the same diopter.

For example, the data unit may store a driving signal (for example, the third driving signal) at 25 degrees or 50 degrees for 2 diopter and a driving signal (for example, the fourth driving signal) at 30 degrees or 40 degrees for 15 diopter.

The first calculation unit may calculate a third diopter of the liquid lens using the first driving signal. In detail, the first calculation unit may calculate the third diopter referring to the initial diopter information using the above-described first driving signal received from the first input unit. That is, the first calculation unit may provide information on the desired diopter. For example, when the first driving signal is 110, it may be identified through the first calculation unit that the 2 diopter corresponding to 110 that is the first driving signal is a diopter for the interface of the liquid lens 280 set by the external system 40.

The second calculation unit may calculate the second driving signal corresponding to the temperature and the third diopter using at least one of the third driving signal and the fourth driving signal of the data unit. In other words, the second calculation unit may calculate the second driving signal that re-adjusts the interface of the liquid lens 280 by compensating with the temperature. Accordingly, the interface of the liquid lens 280 may have a diopter desired in the external system 40 by the second driving signal.

For example, a driving signal at which the interface of the liquid lens has 8 diopter at 10° C. and a driving signal at which the interface of the liquid lens has 8 diopter at 30° C. may be different from each other. Accordingly, in the embodiment, a different driving signal according to the temperature may be output as the second driving signal so that the interface of the liquid lens has the desired diopter through the second calculation unit.

Further, in the embodiment, the second calculation unit may calculate a first driving function for the plurality of third driving signals and a second driving function for the plurality of fourth driving signals. That is, the second calculation unit may calculate the first driving function and the second driving function on the basis of the driving signal for the same diopter of the data unit. The first driving function and the second driving function may be a linear function (that is, the temperature refers to an independent variable and the driving signal refers to a dependent variable) of the driving signal (digital code) for the temperature in the corresponding diopter. A detailed description thereof will be described below. Further, since the digital code (driving function value) according to the temperature and the digital code for the diopter are partially or entirely linear in the liquid lens, the camera module according to the embodiment may improve the accuracy of diopter by compensating with the temperature using such as linear function.

Further, the second calculation unit may calculate a plurality of third driving functions for each temperature form the first driving function and the second driving function. In this case, the third driving functions may be a linear function of the driving signal (digital code) for the diopter. Further, the third driving functions may be calculated according to temperatures. That is, the plurality of third driving functions may be provided and may be different from each other according to the temperature. A detailed description thereof will be described below.

Further, the second calculation unit may calculate the second driving function using at least one of the first driving function, the second driving function, and the plurality of third driving functions. A detailed description thereof will be described below.

Further, the second calculation unit may calculate a fourth driving function that is a digital code for the diopter according to temperatures using the plurality of third driving functions. The fourth driving function may be provided as a plurality of fourth driving functions and may be a linear function. A detailed description thereof will be described below.

Next, the lens assembly 220 may include the liquid lens module 240, and the liquid lens module 240 may include the driving voltage supply unit 270 and the liquid lens 280.

Further, the driving voltage supply unit 270 may receive the driving voltage from the voltage controller 232 and provide the driving voltage to the liquid lens 280.

The driving voltage supply unit 270 may include a voltage adjustment circuit (not illustrated) or a noise removal circuit (not illustrated) for compensating for a loss due to connection between terminals of the control circuit 210 and the lens assembly 220 or may control the voltage provided from the voltage controller 232 to be bypassed and provided to the liquid lens 280. Alternatively, the driving voltage supply unit 270 may be disposed inside the controller 230 to provide the voltage to the liquid lens 280.

Accordingly, the liquid lens 280 may perform at least one of the AF function or the OIS function. In the embodiment, an interface between the first liquid and the second liquid may be deformed according to the driving voltage corresponding to the driving signal generated when the liquid lens 280 performs the OIS function. Further, in the embodiment, in the liquid lens 280, the interface between the first liquid and the second liquid may be deformed according to the driving voltage corresponding to a compensated second driving signal generated through a compensation with the temperature. Accordingly, in the camera module according to the embodiment, problems in which the accuracy is reduced and the resolution is reduced according to the temperature may be easily solved. Further, at least one of the OIS function, the AF function, and a temperature compensation function may be performed (or the functions may be simultaneously performed when the functions are plural).

The external system 40 may transmit the driving signal that is the digital code to the voltage controller 232. As described above, the external system 40 may be located outside the camera module. For example, the external system 40 may be located on a terminal and include a controller or the like. Further, the external system 40 may be connected to the camera module in the above-described I2C communication method. However, the embodiments are not limited thereto, and the external system 40 may be connected in other communication method(s).

The term "~unit" used in the present embodiment refers to software or hardware components such as a field-programmable gate array (FPGA) or an application specific integrated circuit (ASIC), and a "~unit" performs certain roles. However, "~unit" is not limited to the software or the hardware. The "~unit" may be present in an addressable storage medium or may refresh one or more processors. Thus, as an example, the "~unit" includes components such as software components, object-oriented software components, class components, and task components and may include processes, functions, properties, procedures, subroutines, segments of program code, drivers, firmwares, microcodes, circuits, data, databases, data structures, tables, arrays, and variables. Functions provided in the components and "~unit" may be combined into a smaller number of components and "~units" or may be further separated into additional components and "~units." In addition, the components and "~units" may be implemented to reproduce one or more central processing units (CPUs) in a device or a security multimedia card.

Figure 9:
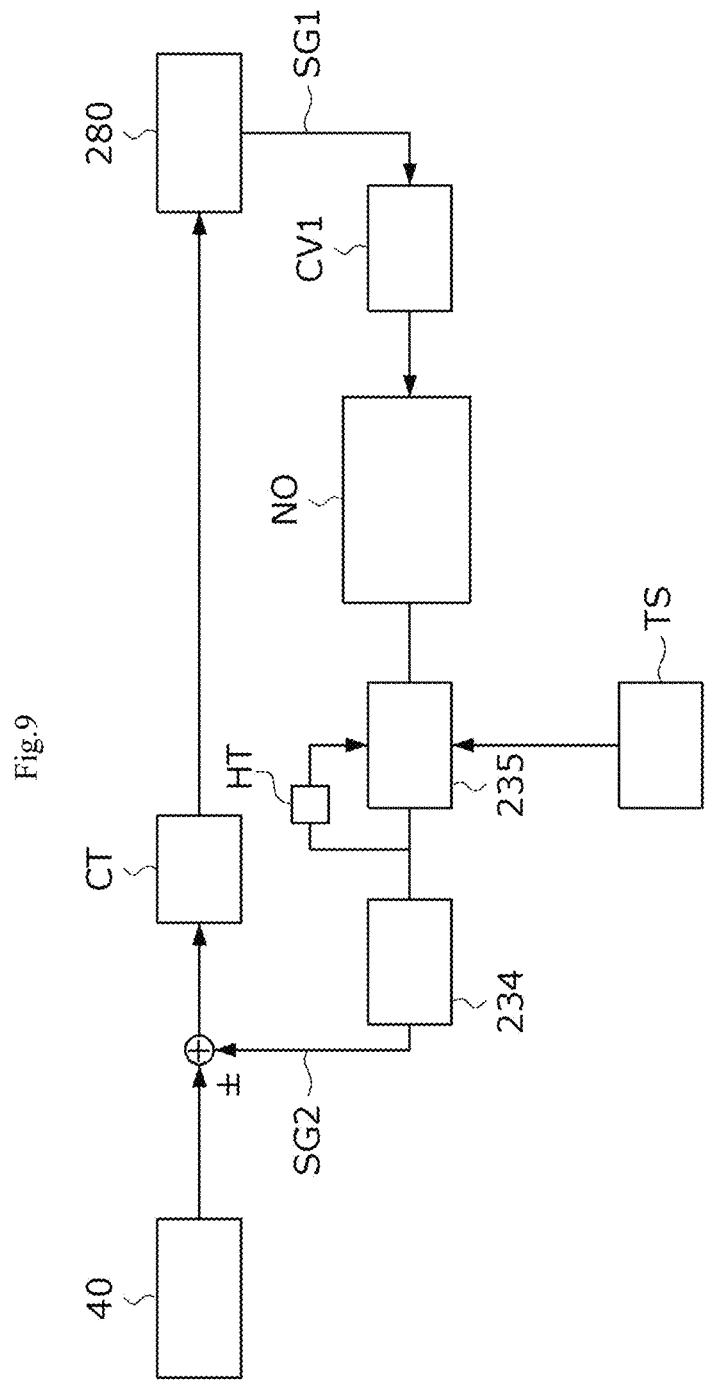
FIG. 9 is a view for describing driving of a controller according to an embodiment.

FIG. 9 is a view for describing driving of a controller according to an embodiment.

Referring to FIG. 9, the controller may generate the driving signal according to the diopter input from the external system 40. In the embodiment, the driving signal may be applied to the liquid lens 280 via a proportional-integral-differential (PID) controller CT. As described above, the driving signal may be converted into the driving voltage, the converted driving voltage may be applied to the individual terminals of the liquid lens 280, and thus the interface of the liquid lens 280 may be changed to the diopter desired in the external system 40.

However, as described above, the interface of the liquid lens may have a diopter different from the diopter desired in the external system 40.

Accordingly, the controller may detect the first driving signal from the capacitor of the liquid lens 280. In detail, an analog voltage signal SC1 detected from the capacitor may be converted into the first driving signal via an analog-to-digital converter CV1. Accordingly, the detection unit may include the analog-to-digital converter CV1.

Next, the controller may convert the first driving signal into various representative values through a compression unit NO. For example, the representative values may be an average value of the driving signals for each electrode. Accordingly, the controller according the embodiment may process the driving signals for each electrode at once, thereby improving a data processing speed and a calculation processing speed.

As described above, the determination unit 235 may receive the temperature from the temperature sensor TS, compare the temperature received from the temperature sensor TS with the target temperature to provide the heating signal to the heater HT that adjusts the temperature of the liquid lens or provide the temperature to the compensation unit 234.

The compensation unit 234 may receive the temperature and the first driving signal and may generate a second driving signal SG2 as described above. Further, the second driving signal SC2 may be applied to the liquid lens 280 to compensate for the interface deformation according to temperatures.

FIGS. 10 to 13 are views for describing driving of a determination unit and a compensation unit according to an embodiment.

Figure 10:
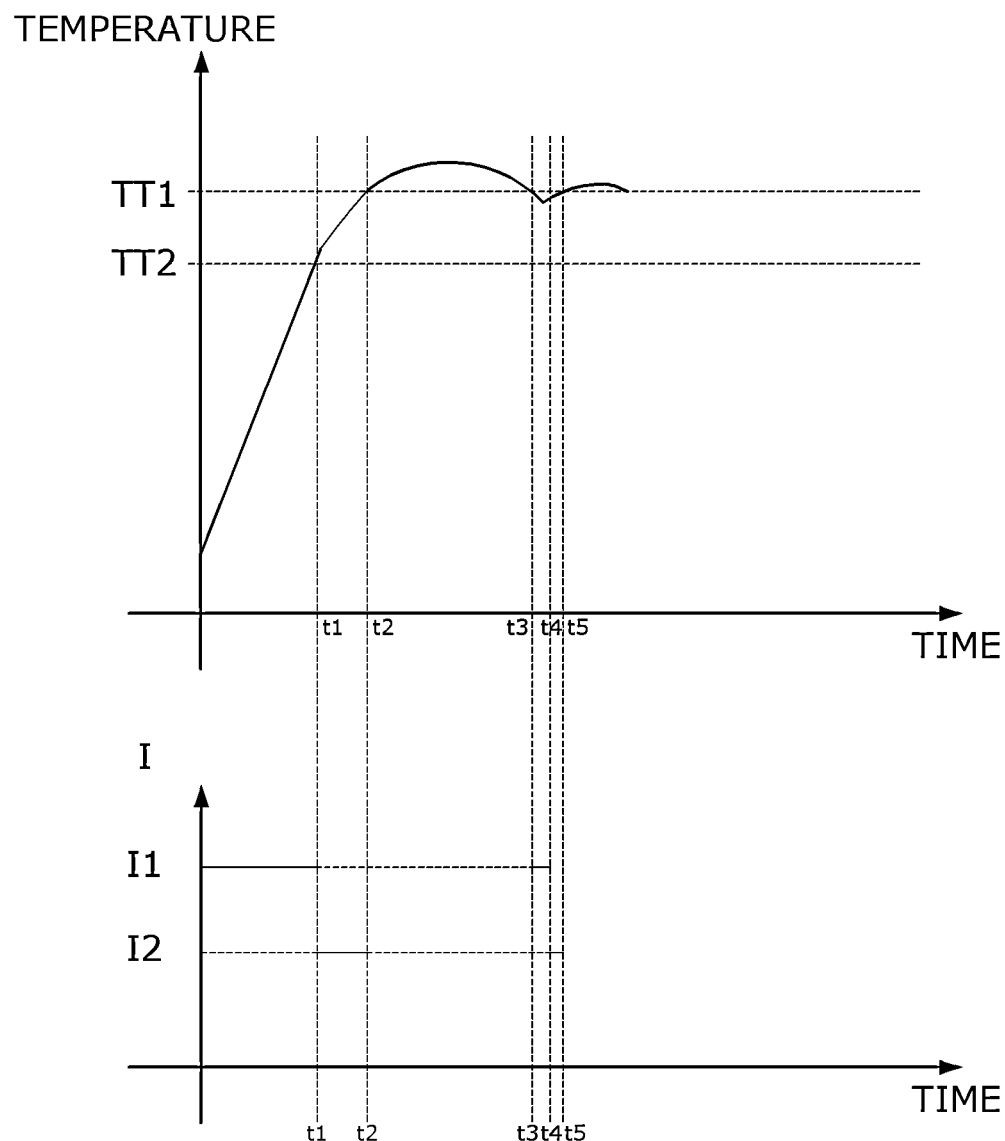
FIGS. 10 to 13 are views for describing driving of a determination unit and a compensation unit according to an embodiment.

First, FIG. 10 shows graphs showing a change in temperature detected by the temperature sensor and a heating signal corresponding to the change according to a time.

Referring to FIG. 10, in a first section (~t1), the temperature is lower than the target temperature TT1 and a predetermined ratio TT2 (hereinafter, referred to as an "intermediate temperature") of the target temperature. In this case, since the detected temperature is lower than the target temperature, the determination unit may provide a heating signal at a first electrical level I1. Accordingly, the heater may be driven by the first electrical level I1 to supply thermal energy to the liquid lens, and the temperature of the liquid lens may increase due to the supplied thermal energy. Further, as the liquid lens has a temperature at which the change in the diopter is small in response to the change in the temperature, the camera module according to the embodiment may maintain high resolution even in the change in outdoor or indoor temperature.

Further, since the detected temperature is lower than the target temperature, the determination unit may receive the temperature from the heater sensor while providing the heating signal to the heater until the detected temperature becomes higher than the target temperature.

In a second section (t1 to t2), the temperature is lower than the target temperature TT1 and is higher than the intermediate temperature TT2. In this case, since the detected temperature is lower than the target temperature and higher than the intermediate temperature, the determination unit may provide a heating signal at a second electrical level I2. The second electrical level I2 may be a predetermined ratio of the first electrical level I1 as described above.

Accordingly, the heater may be driven by the second electrical level I2 to supply thermal energy to the liquid lens. Further, although the temperature of the liquid lens may increase due to the supplied thermal energy, an increase in the temperature according to a time (that is, a slope) may be smaller that of the first section in which the first electrical level I1 is applied. Due to this configuration, the camera module according to the embodiment may easily set, as the target temperature, the temperature of the liquid lens, that is, the detected temperature. Accordingly, the camera module providing improved spatial resolution may be finally provided.

Further, in a third section (t2 to t3), the temperature is higher than the target temperature TT1. In this case, since the detected temperature is higher than the target temperature, the determination unit may not provide a heating signal. As an example, the generation of the thermal energy by the heater may be blocked. Accordingly, since the heater does not supply the thermal energy to the liquid lens, the temperature of the liquid lens may increase and then decrease. Accordingly, the spatial resolution of the camera module may be maintained in an improved state except in a temperature region in which the change in the diopter according to the change in the temperature is large.

In a fourth section (t3 to t4), the temperature may be lower than the target temperature TT1 and higher than the intermediate temperature TT2. In this case, even when the detected temperature is lower than the target temperature, the determination unit may provide a heating signal at the first electrical level I1 because the heating signal at the first electrical level I1 is not being provided to the heater. Accordingly, the heater may be driven by the first electrical level I1 to supply the thermal energy to the liquid lens, and the temperature of the liquid lens may increase due to the supplied thermal energy.

In a fifth section (t4 to t5), the temperature is lower than the target temperature TT1 and is higher than the intermediate temperature TT2. Since the detected temperature is lower than the target temperature and higher than the intermediate temperature, and a heating signal at the first electrical level I1 is being provided to the heater, the determination unit may provide a heating signal at the second electrical level I2. The second electrical level I2 may be a predetermined ratio of the first electrical level I1 as described above.

Figure 11:
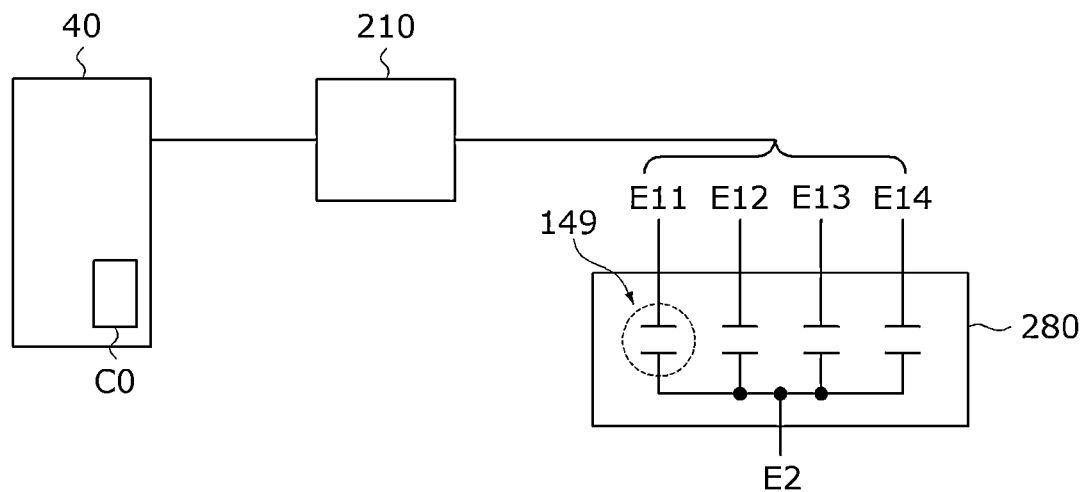

Accordingly, the heater may be driven by the second electrical level I2 to supply the thermal energy to the liquid lens. Further, the temperature of the liquid lens may increase due to the supplied thermal energy. Due to this configuration, the camera module according to the embodiment may easily set, as the target temperature, the temperature of the liquid lens, that is, the detected temperature. Finally, the camera module providing the improved spatial resolution may be provided. FIG. 11 is a view for describing driving by the control circuit 210 regardless of the temperature.

Referring to FIG. 11, the camera module may receive an output value (used interchangeably with an output value of the terminal) for adjusting the interface of the liquid lens 280 from a processor C0 or the like inside the external system 40. This operation may be performed to achieve focus adjustment such as AF or OIS in the external system 40 including the terminal.

For example, output values of the terminal may be PV1, PV2, and the like, and may be provided as a plurality of output values corresponding to the diopters (d1, d2, and the like). For example, when the diopter of the liquid lens is to be set to d1 in the external system 40, the output value of PV1 may be provided to the camera module. Unlike this, when the diopter of the liquid lens is to be set to d2 in the external system 40, the output value of PV2 may be provided to the camera module.

The camera module may adjust the interface of the liquid lens by generating the driving voltage code corresponding to the output value of the terminal received from the external system 40. For example, when the output value of the terminal is PV1, the camera module may output the driving voltage code as dv1. Further, when the output value of the terminal is PV2, the camera module may output the driving voltage code as dv2.

Further, as described above, the voltage controller 232 or the driving voltage supply unit 270 may apply the voltage corresponding to the driving voltage code to the electrodes E11, E12, E13, E14, and E2 of the liquid lens 280 with reference to a voltage table. Accordingly, the liquid lens 280 may have the diopter desired in the external system 40. Further, as described above, the voltage corresponding to the driving voltage code may be a voltage having an analog form.

Figure 12:
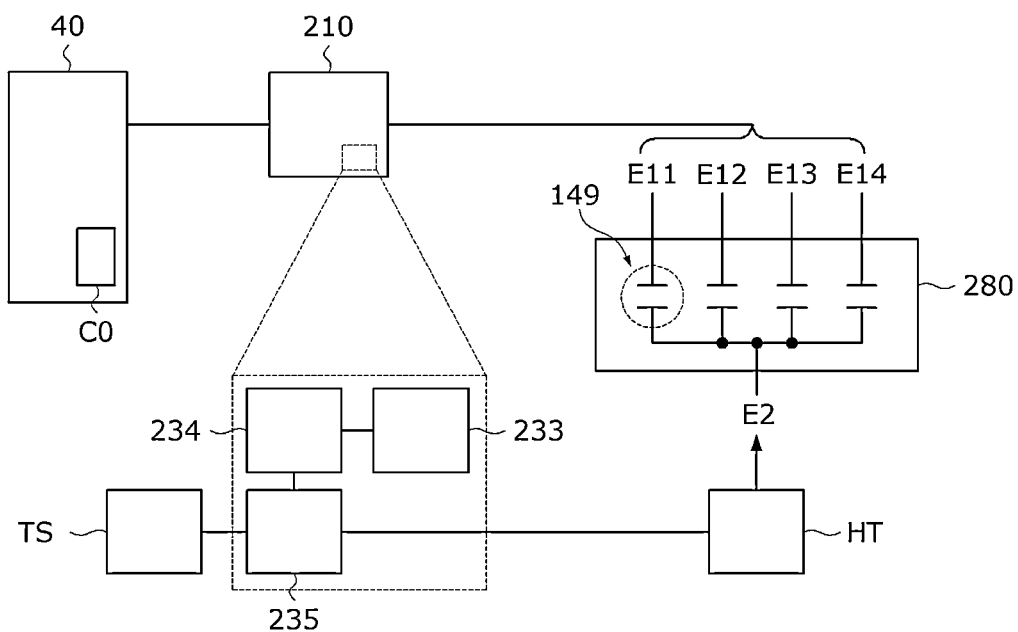

FIG. 12 is a view for describing driving of the control circuit when the temperature is lower than the target temperature.

Referring to FIG. 12, as described above, the camera module may receive the output value (used interchangeably with the output value of the terminal) for adjusting the interface of the liquid lens 280 from the processor C0 or the like inside the external system 40. This operation may be performed to perform focus adjustment such as the AF or the OIS in the external system 40 including the terminal. Further, output values of the terminal are PV1, PV2, and the like, and may be provided as a plurality of output values corresponding to the diopters (d1, d2, and the like).

Further, the camera module may adjust the interface of the liquid lens by generating the driving voltage code corresponding to the output value of the terminal received from the external system 40. For example, when the output value of the terminal is PV1, the camera module may output the driving voltage code as dv1. Further, when the output value of the terminal is PV2, the camera module may output the driving voltage code as dv2.

Further, as described above, the voltage controller 232 or the driving voltage supply unit 270 may apply the voltage corresponding to the driving voltage code to the electrodes E11, E12, E13, E14, and E2 of the liquid lens 280 with reference to the voltage table. Accordingly, the liquid lens 280 may have the diopter desired in the external system 40. Further, as described above, the voltage corresponding to the driving voltage code may be a voltage having an analog form.

The temperature sensor TS may detect the temperature of the liquid lens 280, and the temperature may be provided to the determination unit 235. The determination unit 235 may compare the temperature received from the temperature sensor TS with the target temperature to provide a heating signal to a heater HT that adjusts the temperature of the liquid lens 280 or provide the temperature to the compensation unit 234.

In detail, when the temperature received from the temperature sensor TS is lower than the target temperature, as described above, the determination unit 235 may provide the heating signal at the first electrical level to the heater HT. Further, the heater HT may provide the thermal energy to the liquid lens 280 to maintain the temperature of the liquid lens 280 at a desired value.

Further, when the temperature received from the temperature sensor TS is lower than the target temperature and higher than the intermediate temperature, the determination unit 235 may provide the heating signal at the second electrical level to the heater HT. In more detail, while the heating signal at the first electrical level is provided to the heater HT, when the temperature received from the temperature sensor TS is lower than the target temperature and higher than the intermediate temperature, as described above, the determination unit 235 may provide the heating signal at the second electrical level to the heater HT.

That is, in the embodiment, until the temperature received from the temperature sensor TS reaches the target temperature, the determination unit 235 may provide the heating signal to the heater HT and may receive the temperature detected by the temperature sensor TS. Further, the determination unit 235 may provide the received temperature to the compensation unit 234, and the compensation unit 234 may generate the second driving signal for re-adjusting the interface of the liquid lens 280 using the received temperature and the first driving signal detected by the detection unit 233. The first driving signal may correspond to the above-described driving voltage code. Further, the second driving signal may also correspond to the driving voltage code.

Further, in the liquid lens 280, the interface of the liquid lens may be deformed according to the temperature according to the second driving signal.

Further, the driving voltage codes for temperatures may be different for one diopter. For example, when the temperature is T1 for the diopter d1, the driving voltage code is dv1-d1. Further, when the temperature is T2 for the diopter d1, the driving voltage code is dv2-d1. In this way, the camera module according to the embodiment may use voltage driving codes for each temperature of each diopter according to in order to compensate for the change in the interface of the liquid lens.

Further, as described above, the second driving signal may correspond to the above-described driving voltage codes for each temperature of the diopter. A decrease in the resolution due to an error of the interface according to the change in the temperature may be inhibited. This may be performed irrespective of the temperature reaching the intermediate temperature. Further, when the temperature reaches a daytime temperature, the electrical level of the heating signal may be adjusted to adjust energy provided to the liquid lens.

Figure 13:
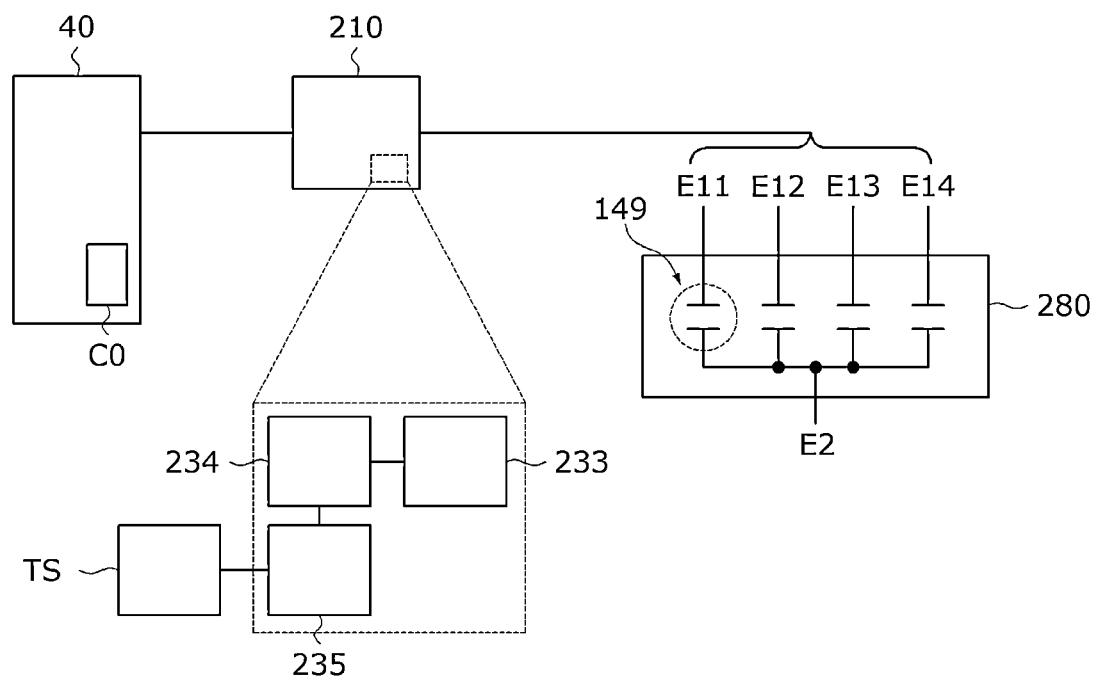

FIG. 13 is a view for describing driving of the control circuit when the temperature is higher than the target temperature.

Referring to FIG. 13, as described above, the camera module may receive the output value (used interchangeably with the output value of the terminal) for adjusting the interface of the liquid lens 280 from the processor C0 or the like inside the external system 40. This operation may be performed to perform focus adjustment such as the AF or the OIS in the external system 40 including the terminal. Further, output values of the terminal are PV1, PV2, and the like, and may be provided as a plurality of output values corresponding to the diopters (d1, d2, and the like).

Further, the camera module may adjust the interface of the liquid lens by generating the driving voltage code corresponding to the output value of the terminal received from the external system 40. For example, when the output value of the terminal is PV1, the camera module may output the driving voltage code as dv1. Further, when the output value of the terminal is PV2, the camera module may output the driving voltage code as dv2.

Further, as described above, the voltage controller 232 or the driving voltage supply unit 270 may apply the voltage corresponding to the driving voltage code to the electrodes E11, E12, E13, E14, and E2 of the liquid lens 280 with reference to the voltage table. Accordingly, the liquid lens 280 may have the diopter desired in the external system 40. Further, as described above, the voltage corresponding to the driving voltage code may be a voltage having an analog form.

However, the temperature sensor TS may detect the temperature of the liquid lens 280, and the temperature may be provided to the determination unit 235. Further, the determination unit 235 may compare the temperature received from the temperature sensor TS with the target temperature to provide the heating signal to the heater HT that adjusts the temperature of the liquid lens 280 or provide the temperature to the compensation unit 234.

When the temperature received from the temperature sensor TS is higher than the target temperature, the determination unit 235 may not provide the heating signal to the heater HT. That is, the operation of the heater HT may be blocked. Accordingly, the energy provided to liquid lens is blocked, and thus the temperature of the liquid lens may be maintained at the target temperature. Accordingly, in the liquid lens, since the change in the diopter according to the change in the temperature is reduced, a decrease in the resolution according to the temperature may be inhibited.

Further, the driving voltage codes for temperatures may be different for one diopter. For example, when the temperature is T1 for the diopter d1, the driving voltage code is dv1-d1. Further, when the temperature is T2 for the diopter d1, the driving voltage code is dv1-d1. Further, when the temperature is t1 for the diopter d2, the driving voltage code is dv2-d2, and when the temperature is t2 for the diopter d2, the driving voltage code is dv2-d2. In this way, the camera module according to the embodiment may use the voltage driving code for each temperature of each diopter in order to compensate for the change in the interface of the liquid lens.

Further, the second driving signal may correspond to the above-described driving voltage code of the diopter according to each temperature. Accordingly, a decrease in the resolution due to the error of the interface according to the change in the temperature may be inhibited.

Figure 14:
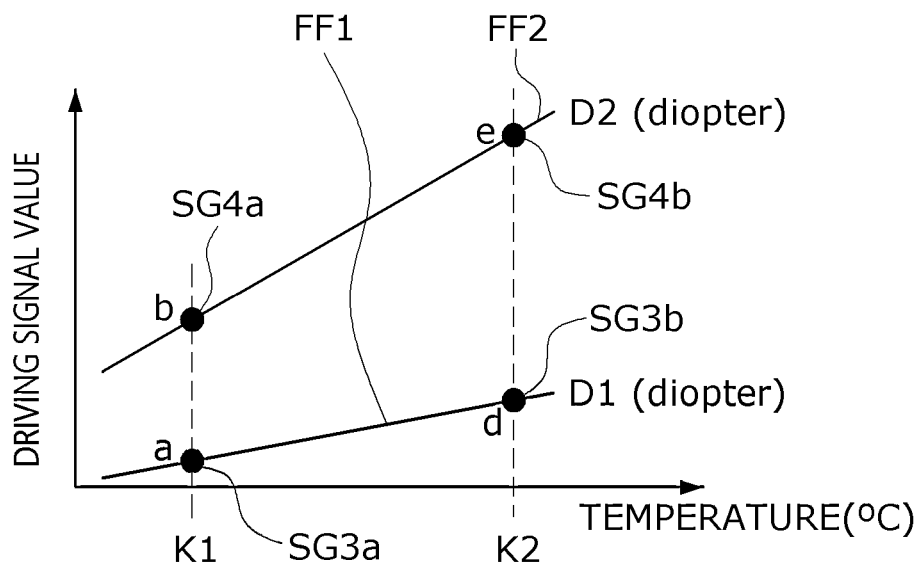
FIGS. 14 to 16 are views for describing driving of the compensation unit according to an embodiment.
Figure 15:
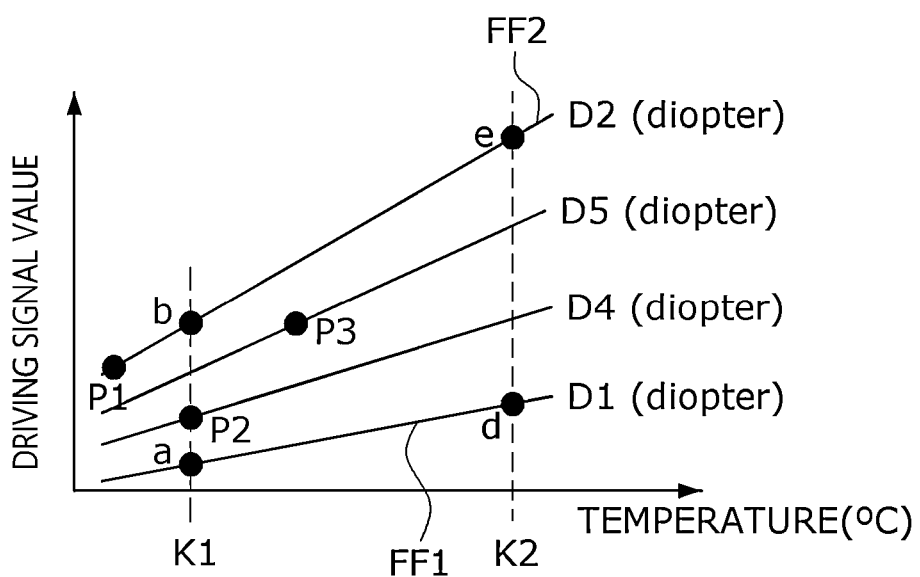
Figure 16:
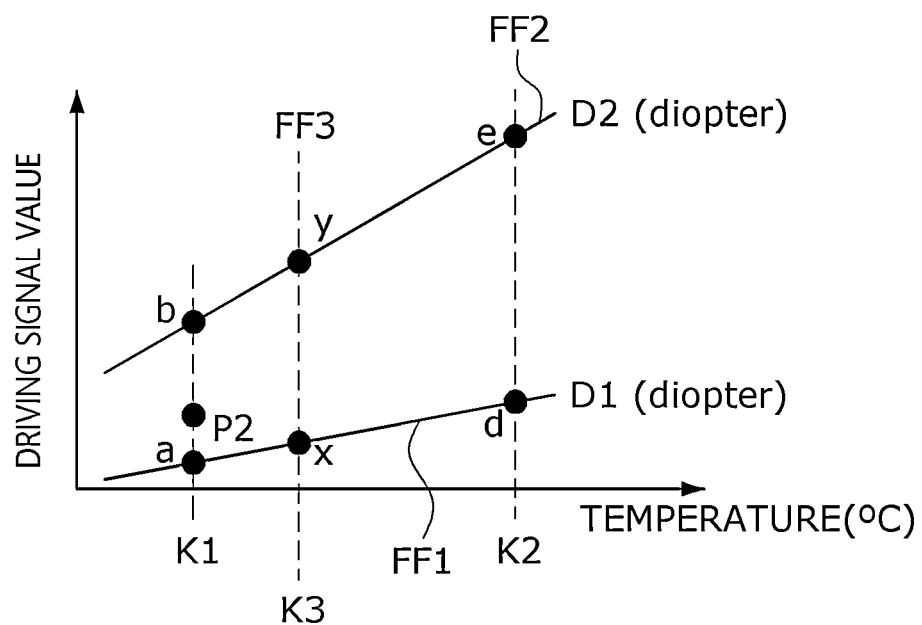

FIGS. 14 to 16 are views for describing driving of the compensation unit according to an embodiment.

Referring to FIG. 14, the compensation unit (the second calculation unit) according to the embodiment may receive, from the data unit, stored driving signals for each temperature or each diopter.

In the embodiment, the compensation unit may generate a first driving function FF1 and a second driving function FF2 from third driving signals SG3a and Sg3b and fourth driving signals SG4a and Sg4b. Further, hereinafter, a, b, d, e, x, and y may be digital codes (driving signal values).

In detail, the third driving signals SG3a and SG3b are digital codes at different temperatures K1 and K2 for a first diopter D1, and the first driving function FF1 is a linear function of the digital code (the driving signal value) for a temperature in the first diopter D1.

Further, the fourth driving signals SG4a and SG4b are digital codes at the different temperatures K1 and K2 for a second diopter D2, and the second driving function FF2 is a linear function of the digital code for a temperature in the second diopter D2. In this case, the temperature corresponding to the third driving signals SG3a and SG3b and the temperature corresponding to the fourth driving signals SG4a and SG4b may be different from each other or at least some thereof may be the same.

Referring to FIGS. 15 and 16, the compensation unit may calculate a $(2-1)^{th}$ driving signal P1 using the second driving function FF2. As an example, the $(2-1)^{th}$ driving signal P1 may be located on the second driving function FF2, and as described above, the second driving function FF2 may be calculated as a linear function (for example, a first-order function) for the fourth driving signals SG4a and SG4b. Further, the compensation unit (or the second calculation unit) may calculate, as the $(2-1)^{th}$ driving signal P1, a driving signal value corresponding to a third diopter (the second diopter D2 with respect to the $(2-1)^{th}$ driving signal P1) calculated by the first calculation unit and a temperature (referring to FIG. 11, a value smaller than K1) detected by the temperature sensor. Accordingly, the interface of the liquid lens may operate at the second diopter D2.

Further, the compensation unit may calculate a plurality of third driving functions FF3 for temperatures from the first driving function FF1 and the second driving function FF2.

In the embodiment, as illustrated in FIG. 10, when the third driving signals SG3a and SG3b and the fourth driving signals SG4a and SG4b are driving signal values for the same temperature, the compensation unit may calculate the third driving functions using the third driving signals and the fourth driving signals.

That is, the compensation unit may calculate the third driving functions using the driving signal values a and b and the diopters D1 and D2 of the third driving signals and the driving signal values d and e and the diopters D1 and D2 of the fourth driving signals. For example, the compensation unit may calculate the third driving function as a linear function of the driving signal for the diopter at K1 using the driving signal values a and b and the diopters (the first diopter D1 and the second diopter D2) of the third driving signals.

In the embodiment, the compensation unit may calculate a $(2-2)^{th}$ driving signal P2 using the third driving functions. Further, the $(2-2)^{th}$ driving signal P2 may be located on the third driving function, and the compensation unit (or the second calculation unit) may calculate, as the $(2-1)^{th}$ driving signal P2, a driving signal value corresponding to the third diopter (the fourth diopter D4 with respect to the $(2-2)^{th}$ driving signal P2) calculated by the first calculation unit and the temperature (referring to FIG. 11, K1) detected by the temperature sensor. Accordingly, the interface of the liquid lens may operate at the fourth diopter D4.

FIG. 17 is a flowchart illustrating a method of driving a camera module according to an embodiment.

A method of driving a camera module according to the embodiment may include operation S310 of receiving a detected temperature, operation S320 of comparing the received temperature with the target temperature, operations S330 and S340 of compensating with the temperature or applying the heating signal at the first electrical level, operation S350 of determining whether the temperature is higher than a temperature of a predetermined ratio of the target temperature, operation S360 of applying the heating signal at the second electrical level, and operation S370 of determining whether the temperature reaches the target temperature.

First, the detected temperature may be received (S310). As described above, the temperature sensor may detect the temperature of the liquid lens, and the detected temperature may be provided to the determination unit.

Further, the received temperature and the target temperature may be compared with each other (S320). In the embodiment, it may be compared whether the temperature of the liquid lens received from the temperature sensor is lower than the target temperature.

When the detected temperature is higher than the target temperature, the determination unit may provide the detected temperature to the compensation unit, and the compensation unit may generate the second driving signal using the detected temperature and the first driving signal (S330). Further, the liquid lens may change the interface of the liquid lens in response to the second driving signal. Accordingly, the interface of the liquid lens may be compensated for according to the temperature, thereby improving the resolution of the camera module.

When the detected temperature is lower than the target temperature, the detection unit may apply the heating signal at the first electrical level to the heater (S340). Further, the heater may provide the energy to the liquid lens in response to the heating signal at the first electrical level. Accordingly, the temperature of the liquid lens may increase by the heater.

Further, the detected temperature may be compared with the intermediate temperature (a temperature of a predetermined ratio of the target temperature) (S350). When the detected temperature is higher than the intermediate temperature, the determination unit may apply the heating signal at the second electrical level to the heater (S360). Unlike this, when the detected temperature is lower than the intermediate temperature, the determination unit may continue to provide the heating signal at the first electrical level to the heater.

Further, the determination unit may compare whether the detected temperature reaches the target temperature (S370). When the detected temperature is higher than the target temperature, the detected temperature may be provided to the compensation unit so that the compensation unit compensates with the temperature. Unlike this, when the detected temperature does not reach the target temperature, the process may return to an operation of comparing the temperature with the intermediate temperature.

The invention claimed is:

1. A camera module comprising:
   a lens assembly including a liquid lens;
   a temperature sensor that detects a temperature of the liquid lens;
   an image sensor that receives light passing through the lens assembly;
   a detection unit that detects a first driving signal applied to the liquid lens to adjust an interface of the liquid lens; and
   a determination unit that compares the temperature with a target temperature to provide a heating signal to a heater for adjusting the temperature of the liquid lens or to provide the temperature to a compensation unit,
   wherein the compensation unit compensates the first driving signal with the temperature to generate a second driving signal for re-adjusting the interface of the liquid lens,
   wherein the compensation unit includes:
      a first input unit that receives the first driving signal;
      a second input unit that receives the temperature;
      a data unit that stores a plurality of third driving signals for each temperature with respect to a first diopter of the liquid lens and a plurality of fourth driving signals for each temperature with respect to a second diopter of the liquid lens;
      a first calculation unit that calculates a third diopter of the liquid lens using the first driving signal; and
      a second calculation unit that calculates the second driving signal corresponding to the temperature and the third diopter using at least one of the plurality of third driving signals and the plurality of fourth driving signals,
   wherein the second calculation unit calculates a first driving function for the plurality of third driving signals and a second driving function for the plurality of fourth driving signals,
   wherein the plurality of third driving signals are first digital codes at different temperatures for the first diopter, and the plurality of fourth driving signals are second digital codes at the different temperatures for the second diopter,
   wherein the second calculation unit calculates a third driving function using driving signal values and diopters of the plurality of third driving signals and driving signal values and diopters of the plurality of fourth driving signals, and
   wherein the second calculation unit calculates a plurality of fourth driving functions for each temperature from the first driving function and the second driving function and calculates the second driving signal using at least one of the first driving function, the second driving function, and the plurality of fourth driving functions.

2. The camera module of claim 1, wherein the determination unit provides a heating signal at a first electrical level when the temperature is lower than a predetermined ratio of the target temperature.

3. The camera module of claim 2, wherein the determination unit provides a heating signal at a second electrical level when the temperature is higher than the predetermined ratio of the target temperature and lower than the target temperature, and
   the heating signal at the second electrical level is lower than the first electrical level.

4. The camera module of claim 2, wherein the determination unit provides only the temperature to the compensation unit when the temperature is higher than the target temperature.

5. The camera module of claim 2, comprising a voltage controller that outputs a driving voltage corresponding to a shape of the interface of the liquid lens according to the first driving signal and the second driving signal.

6. The camera module of claim 1, wherein the first diopter and the second diopter are different from each other.

7. The camera module of claim 1, wherein the liquid lens includes:
   a plate including a cavity in which a conductive liquid and a non-conductive liquid are arranged with an interface formed therebetween;
   a common terminal disposed on the plate; and
   a plurality of individual terminals arranged under the plate,
   wherein the first driving signal corresponds to voltages applied to the plurality of individual terminals or an average voltage of the voltages.

8. The camera module of claim 1, wherein the first driving function is a linear function.

9. The camera module of claim 1, wherein the second driving function is a linear function.

10. The camera module of claim 1, wherein the third driving function is a linear function.

* * * * *